United States Patent
Fujimoto et al.

(10) Patent No.: US 11,735,975 B2
(45) Date of Patent: Aug. 22, 2023

(54) DRIVE DEVICE

(71) Applicant: Nidec Corporation, Kyoto (JP)

(72) Inventors: Shohei Fujimoto, Kyoto (JP); Hibiki Takada, Kyoto (JP); Shuhei Nakamatsu, Kyoto (JP); Keisuke Aso, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 17/560,476

(22) Filed: Dec. 23, 2021

(65) Prior Publication Data

US 2022/0209619 A1    Jun. 30, 2022

(30) Foreign Application Priority Data

Dec. 25, 2020 (JP) ................... 2020-217578
Mar. 25, 2021 (JP) ................... 2021-051921

(51) Int. Cl.
*H02K 7/08* (2006.01)
*H02K 5/20* (2006.01)
*H02K 7/10* (2006.01)

(52) U.S. Cl.
CPC ............... *H02K 5/203* (2021.01); *H02K 7/08* (2013.01); *H02K 7/10* (2013.01)

(58) Field of Classification Search
CPC ............ H02K 5/203; H02K 7/08; H02K 7/10; H02K 7/116
See application file for complete search history.

(56) References Cited

U.S. PATENT DOCUMENTS

| | | | | |
|---|---|---|---|---|
| 5,894,653 | A * | 4/1999 | Nakamura | H02K 15/14 310/413 |
| 7,980,343 | B2 * | 7/2011 | Mogi | F16H 57/0476 184/6.12 |
| 10,734,866 | B2 * | 8/2020 | Yoshinori | H02K 9/19 |
| 2018/0159403 | A1 | 6/2018 | Yokoyama et al. | |

FOREIGN PATENT DOCUMENTS

| | | |
|---|---|---|
| JP | 2014-225987 A | 12/2014 |
| WO | 2016/185575 A1 | 11/2016 |

* cited by examiner

*Primary Examiner* — Dang D Le
(74) *Attorney, Agent, or Firm* — Keating & Bennett

(57) ABSTRACT

A transmission housing of a drive device is fixed to one side in an axial direction of a motor housing that includes a first housing and a second housing fixed to another side in the axial direction of the first housing. The transmission housing includes a third housing fixed to the first housing and a fourth housing fixed to one side in the axial direction of the third housing. A bolt fixing the first and second housings passes through a through-hole of the second housing from the another side in the axial direction, and is fixed to a bolt hole of the first housing. A bolt fixing the second and third housings passes through a through hole of the first housing from the another side in the axial direction, and is fixed to a bolt hole of the third housing.

20 Claims, 14 Drawing Sheets

DRIVE DEVICE

CROSS-REFERENCE TO RELATED APPLICATIONS

The present application claims priority under 35 U.S.C. § 119 to Japanese Patent Application No. 2020-217578, filed on Dec. 25, 2020, and Japanese Patent Application No. 2021-051921, filed on Mar. 25, 2021, the entire contents of which are hereby incorporated herein by reference.

FIELD OF THE INVENTION

The present disclosure relates to a drive device.

BACKGROUND

A rotary electric machine including a housing that houses an electric motor therein and a refrigerant flow path in the housing is known.

In the rotary electric machine described above, the housing includes a front cover, a rear cover, and a main body. Screw holes are provided on one side in the axial direction and the other side in the axial direction of the main body, and the front cover and the rear cover are attached with bolts (not illustrated). On the other hand, in a drive device for an electric vehicle, it is necessary to integrally mount a motor housing and a transmission mechanism housing of the rotary electric machine. In the structure in which the front cover and the rear cover are attached to the main body from both ends in the axial direction as in the rotary electric machine described above, the number of divisions of the housing of the drive device increases, and the weight of the drive device increases.

SUMMARY

A drive device according to an example embodiment of the present disclosure includes a motor including a rotor rotatable about a central axis and a stator covering a radially outer side of the rotor, a transmission connected to the motor, and a housing including a motor housing accommodating the motor therein and a transmission housing fixed to one side in the axial direction of the motor housing and accommodating the transmission therein. The motor housing includes a first housing fixed to the transmission housing, and a second housing fixed to another side in the axial direction of the first housing with bolts. The transmission housing includes a third housing fixed to the first housing with bolts, and a fourth housing fixed to one side in the axial direction of the third housing with bolts. The bolts fixing the first housing and the second housing each pass through through-holes in the second housing from the another side in the axial direction, and are fixed to bolt holes in the first housing. The bolts fixing the second housing and the third housing each pass through through-holes in the first housing from the another side in the axial direction, and are fixed to bolt holes in the third housing. The bolts fixing the third housing and the fourth housing each pass through through-holes in the fourth housing from one side in the axial direction, and are fixed to bolt holes in the third housing.

The above and other elements, features, steps, characteristics and advantages of the present disclosure will become more apparent from the following detailed description of the example embodiments with reference to the attached drawings.

DETAILED DESCRIPTION

Figure 1:
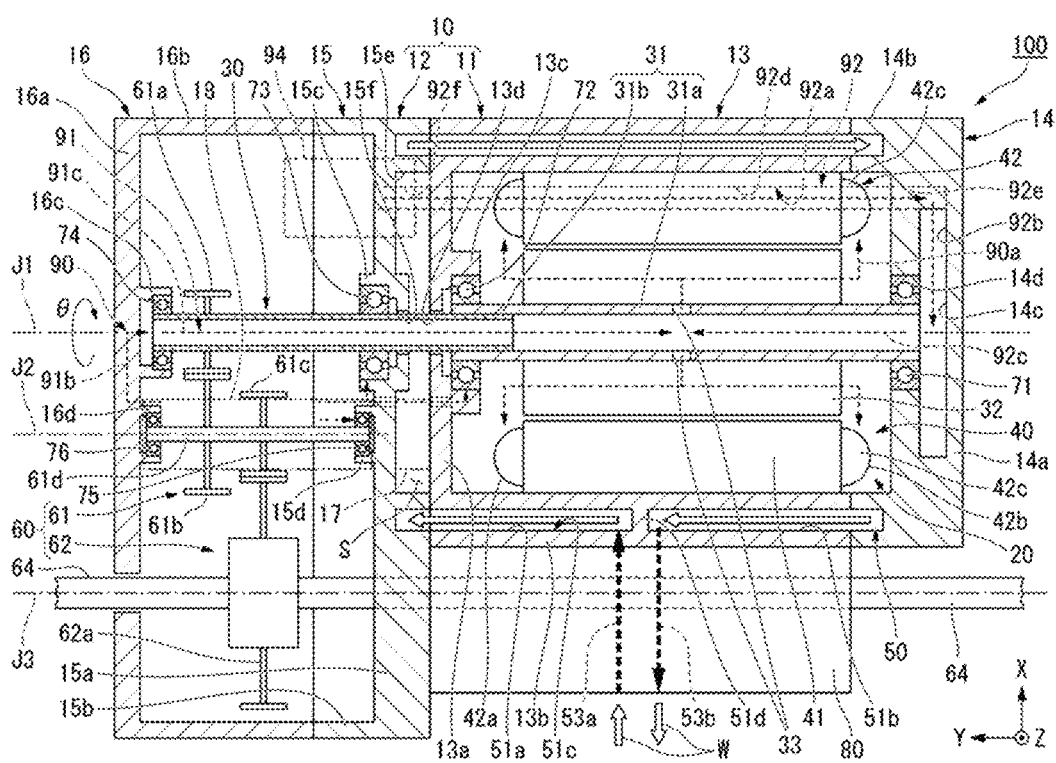
FIG. 1 is a sectional view of a drive device of a first example embodiment of the present disclosure as viewed from above.

The following description will be made with a vertical direction being defined on the basis of positional relationships in the case where a drive device according to example embodiments is installed in a vehicle located on a horizontal road surface. That is, it is sufficient that the relative positional relationships regarding the vertical direction described in the following example embodiments are satisfied at least in the case where the drive device is installed in the vehicle located on the horizontal road surface.

In the drawings, an xyz coordinate system is illustrated appropriately as a three-dimensional orthogonal coordinate system. In the xyz coordinate system, a z-axis direction corresponds to the vertical direction. A +Z side is an upper side in the vertical direction, and a −Z side is a lower side in the vertical direction. In the following description, the upper side and the lower side in the vertical direction will be referred to simply as the "upper side" and the "lower side", respectively. An x-axis direction corresponds to a front-rear direction of the vehicle in which the drive device is installed, i.e., a direction perpendicular to the z-axis direction. In the preferred example embodiment described below, a +X side corresponds to a forward side in the vehicle, while a −X side corresponds to a rearward side in the vehicle. A Y-axis direction corresponds to a left-right direction of the vehicle, i.e., a width direction of the vehicle, and is a direction perpendicular to both the x-axis direction and the z-axis direction. In the following example embodiments described below, a +Y side corresponds to a left side in the vehicle, while a −Y side corresponds to a right side in the vehicle. Each of the front-rear direction and the left-right direction is a horizontal direction perpendicular to the vertical direction.

Note that the definition of the forward and rearward sides in the front-rear direction is not limited to the definition of the preferred example embodiment described below, and that the +X side and the −X side may correspond to the rearward side and the forward side, respectively, of the vehicle. In this case, the +Y side corresponds to the right side of the vehicle, while the −Y side corresponds to the left side of the vehicle. Further, in the present specification, it is assumed that the term "parallel" as used herein includes both "parallel" and "substantially parallel", and that the term "perpendicular" as used herein includes both "perpendicular" and "substantially perpendicular".

A central axis J1 illustrated in the drawing as appropriate is a virtual axis extending in a direction intersecting the vertical direction. More specifically, the central axis J1 extends in the Y-axis direction perpendicular to the vertical direction, that is, in the left-right direction of the vehicle. In description below, unless otherwise particularly stated, a direction parallel to the central axis J1 is simply referred to as the "axial direction", a radial direction about the central axis J1 is simply referred to as the "radial direction", and a circumferential direction about the central axis J1, that is, a direction around the central axis J1 is simply referred to as the "circumferential direction". In the following example embodiments, the left side (+Y side) is referred to as "one side in the axial direction", and the right side (−Y side) is referred to as "the other side in the axial direction".

An arrow θ appropriately illustrated in the drawing indicates the circumferential direction. In the following description, a side traveling counterclockwise about the central axis J1 as viewed from one side (+Y side) in the axial direction in the circumferential direction, that is, a side (+θ side) on which the arrow θ faces is referred to as "one side in the circumferential direction", and a side traveling clockwise about the central axis J1 as viewed from one side in the axial direction in the circumferential direction, that is, a side (−θ side) opposite to the side on which the arrow θ faces is referred to as "the other side in the circumferential direction".

Figure 2:
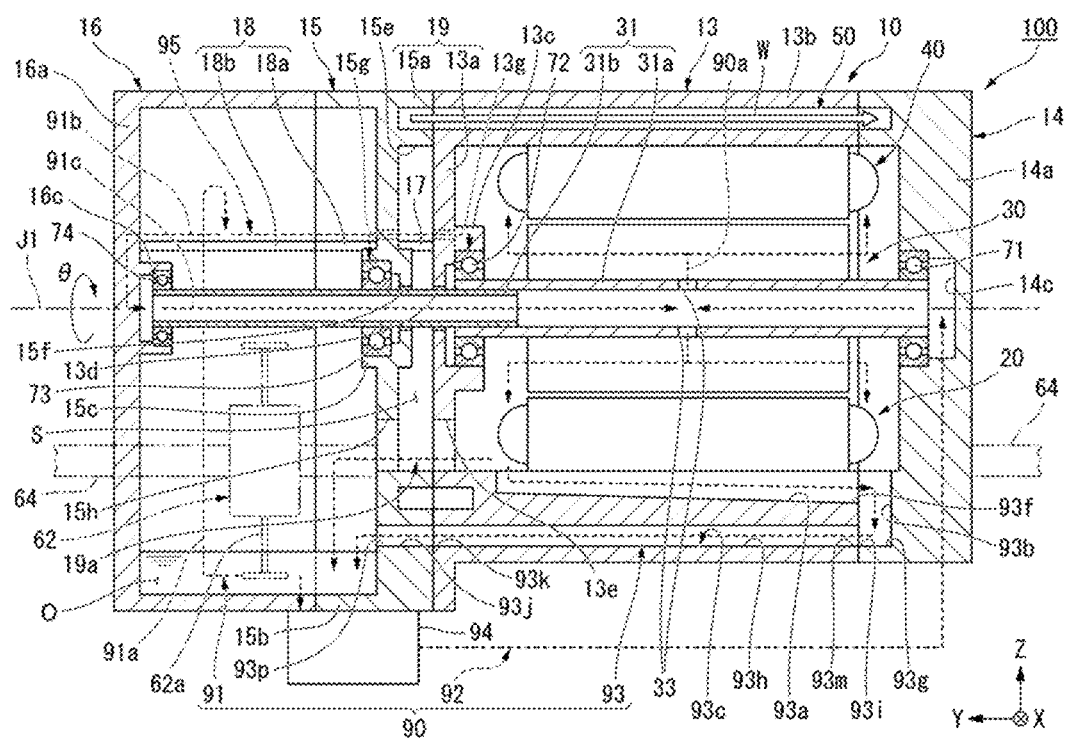
FIG. 2 is a sectional view of the drive device of the first example embodiment as viewed from above.

A drive device 100 of the present example embodiment illustrated in FIGS. 1 and 2 is a drive device that is mounted on a vehicle and rotates an axle 64. A vehicle mounted on the drive device 100 is a vehicle having a motor such as a hybrid vehicle (HEV), a plug-in hybrid vehicle (PHV), and an electric vehicle (EV) as a power source. As illustrated in FIGS. 1 and 2, the drive device 100 includes a motor 20, a transmission 60, a housing 10 having a motor housing 11 accommodating the motor 20 therein and a transmission housing 12 accommodating the transmission 60 therein, bearings 71 to 76, an inverter unit 80, and a pump 94. The motor housing 11 and the transmission housing 12 are separate bodies fixed to each other. The transmission housing 12 is fixed to one side in the axial direction of the motor housing 11. That is, the transmission housing 12 is connected to one side in the axial direction of the motor housing 11. Each of the bearings 71 to 76 is, for example, a ball bearing.

The motor 20 drives the drive device 100. The motor 20 includes a rotor 30 rotatable about a central axis J1 extending in the axial direction, and a stator 40. The rotor 30 includes a shaft 31 and a rotor body 32. The shaft 31 is rotatable about the central axis J1. The shaft 31 is rotatably supported by the bearings 71, 72, 73, and 74. Thus, the bearings 71, 72, 73, and 74 rotatably support the rotor 30.

In the present example embodiment, the shaft 31 is a hollow shaft. The shaft 31 has a columnar shape about the central axis J1 and extends axially. The shaft 31 is provided with a hole 33 connecting the inside of the shaft 31 and the outside of the shaft 31. The shaft 31 extends across the inside of the motor housing 11 and the inside of the transmission housing 12. An end on one side in the axial direction of the shaft 31 protrudes into the transmission housing 12. A speed-reduction device 61 is connected to an end on one side in the axial direction of the shaft 31.

In the present example embodiment, the shaft 31 is configured by connecting a first shaft member 31a and a second shaft member 31b in the axial direction. The first shaft member 31a is accommodated in the motor housing 11. The first shaft member 31a is provided with the hole 33. The second shaft member 31b is coupled to one side in the axial direction of the first shaft member 31a. The outer diameter of the second shaft member 31b is smaller than the outer diameter of the first shaft member 31a. The end on the other side in the axial direction of the second shaft member 31b is fitted into the inside of the end on one side in the axial direction of the first shaft member 31a. The second shaft member 31b extends from the inside of the motor housing 11 to the inside of the transmission housing 12. The first shaft member 31a and the second shaft member 31b are connected to each other by spline fitting, for example. The first shaft member 31a is rotatably supported by the bearings 71 and 72. The second shaft member 31b is rotatably supported by the bearings 73 and 74.

The rotor body 32 is fixed to the outer peripheral surface of the shaft 31. More specifically, the rotor body 32 is fixed to the outer peripheral surface of the first shaft member 31a. Although not illustrated in the drawings, the rotor body 32 includes a rotor core, and a rotor magnet fixed to the rotor core.

The stator 40 is located outward the rotor 30 in the radial direction. The stator 40 is fixed inside the motor housing 11. The stator 40 includes a stator core 41 and a coil assembly 42. The stator core 41 has an annular shape surrounding the rotor 30. The coil assembly 42 has a plurality of coils 42c attached to the stator core 41 along the circumferential direction. The plurality of coils 42c are attached to the stator core 41 with, for example, an insulator (not illustrated) interposed between them. Although not illustrated in the drawings, the coil assembly 42 may include a binding member or the like which is used to bind the coils 42c together, and may include a passage line arranged to join the coils 42c to one another. The coil assembly 42 includes a coil end 42a protruding from the stator core 41 to one side in the axial direction and a coil end 42b protruding from the stator core 41 to the other side in the axial direction.

The transmission 60 is connected to the motor 20. The transmission 60 transmits the rotation of the rotor 30 to the axle 64 of the vehicle. As illustrated in FIG. 1, the transmission 60 of the present example embodiment includes the speed-reduction device 61 connected to the motor 20 and a differential device 62 connected to the speed-reduction device 61.

The speed-reduction device 61 includes a first gear 61a, a second gear 61b, a third gear 61c, and a gear shaft 61d. The first gear 61a is fixed to a portion of the shaft 31 located inside the transmission housing 12. The second gear 61b and the third gear 61c are fixed to the gear shaft 61d. The second gear 61b meshes with the first gear 61a. The gear shaft 61d extends in the axial direction about a gear axis J2 extending in parallel with the central axis J1. The gear axis J2 is a virtual axis located on the lower side of the central axis J1. For example, the gear axis J2 is located on the rear side (−X side) of the central axis J1. The gear shaft 61d is rotatably supported by the bearings 75 and 76.

The differential device 62 includes a ring gear 62a. The ring gear 62a meshes with the third gear 61c. The lower end of the ring gear 62a is immersed in the oil O stored in the transmission housing 12. When the ring gear 62a rotates, the oil O is scraped up. The scraped oil O is supplied to, for example, the speed-reduction device 61 and the differential device 62 as lubricating oil. The differential device 62 rotates the axle 64 about a differential axis J3. The differential axis J3 is a virtual axis extending in parallel with the central axis J1.

The motor housing 11 accommodates the rotor 30 and the stator 40 in the inside. The motor housing 11 has a first housing 13 and a second housing 14.

The first housing 13 is a tubular member surrounding the motor 20 on the radial outside of the motor 20. In the present example embodiment, the inner peripheral surface of the first housing 13 has the cylindrical shape centered on the central axis J1. The first housing 13 is open to the other side in the axial direction. The first housing 13 is fixed to the transmission housing 12. The stator core 41 is fitted in the first housing 13. The first housing 13 includes a first opposing wall 13a expanding in the radial direction, a peripheral wall 13b extending from a radially outer peripheral edge portion of the first opposing wall 13a to the other side in the axial direction, and a bearing holding portion 13c provided on the first opposing wall 13a.

The first opposing wall 13a faces the transmission housing 12 in the axial direction. The first opposing wall 13a is located on the other side in the axial direction of the transmission housing 12. The first opposing wall 13a is fixed to the transmission housing 12. The first opposing wall 13a has a hole 13d axially penetrating the first opposing wall 13a. The hole 13d has a circular shape centered on the central axis J1. The second shaft member 31b passes through the hole 13d in the axial direction.

As illustrated in FIG. 2, the first opposing wall 13a has a through hole 13e penetrating the first opposing wall 13a in the axial direction. The through hole 13e is a through hole that connects a space S located between the first opposing wall 13a and a second opposing wall 15a to be described later in the axial direction and the inside of the motor housing 11. The through hole 13e is provided in a portion of the first opposing wall 13a located on the lower side of the bearing holding portion 13c. The lower end of the through hole 13e is connected to the inner peripheral surface of the peripheral wall 13b.

Figure 3:
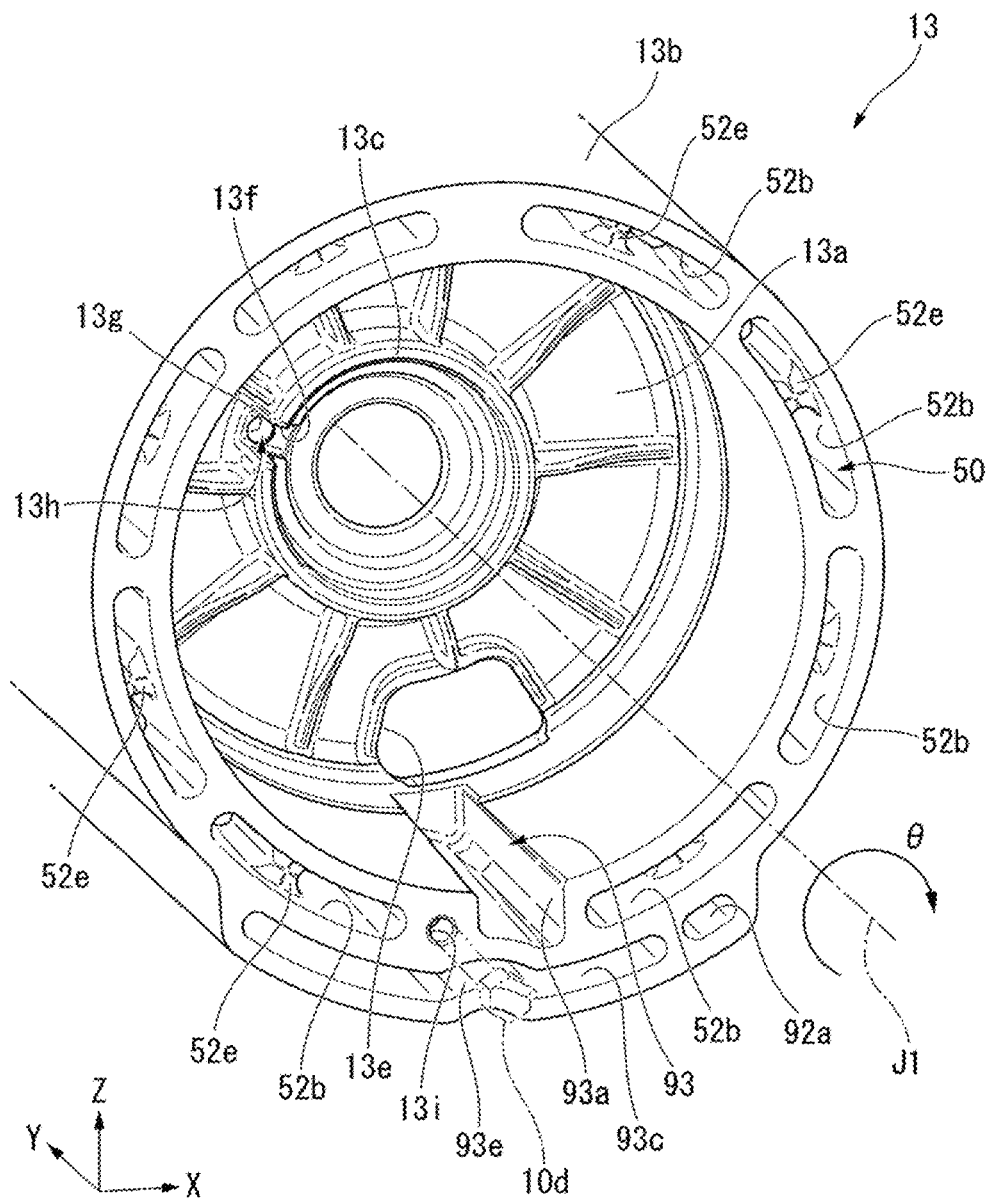
FIG. 3 is a perspective view illustrating a portion of a first housing of a motor housing of the first example embodiment.

In the present example embodiment, the bearing holding portion 13c is provided on the surface on the other side in the axial direction of the first opposing wall 13a. The bearing holding portion 13c protrudes from the surface on the other side in the axial direction of the first opposing wall 13a to the other side in the axial direction. As illustrated in FIG. 3, the bearing holding portion 13c has a cylindrical shape centered on the central axis J1. The bearing holding portion 13c has a penetration portion 13f penetrating the bearing holding portion 13c in the radial direction. In the present example embodiment, the penetration portion 13f penetrates a portion of the bearing holding portion 13c located above the central axis J1 and on the rear side (−X side) in the radial direction. The penetration portion 13f extends rearward and obliquely upward from the inner peripheral surface of the bearing holding portion 13c to the outer peripheral surface of the bearing holding portion 13c. As illustrated in FIG. 1, the bearing holding portion 13c holds the bearing 72 therein.

Figure 4:
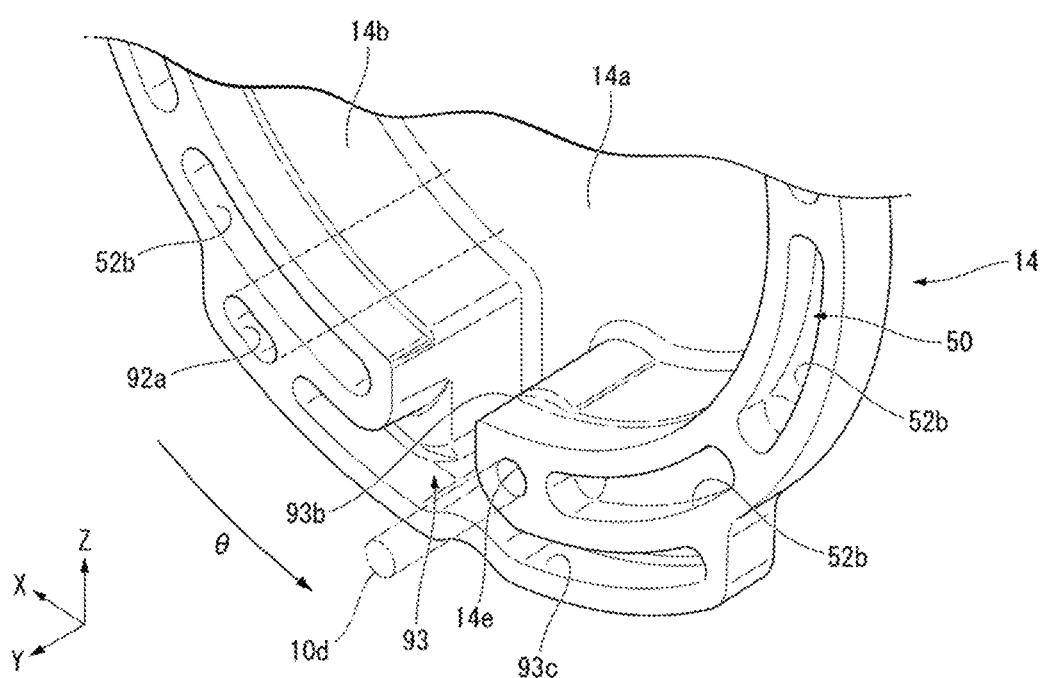
FIG. 4 is a perspective view illustrating a portion of a second housing of the motor housing of the first example embodiment.

The second housing 14 is separate from the first housing 13. The second housing 14 is fixed to the other side in the axial direction of the first housing 13. The second housing 14 closes the opening on the other side in the axial direction of the first housing 13. As illustrated in FIG. 4, the second housing 14 includes a lid wall 14a that expands in the radial direction, and a peripheral wall 14b that extends from a radially outer peripheral edge portion of the lid wall 14a to one side in the axial direction. As illustrated in FIG. 1, an end on one side in the axial direction of the peripheral wall 14b is in contact with an end on the other side in the axial direction of the peripheral wall 13b in the first housing 13. The lid wall 14a has a recess 14c recessed from the surface on one side in the axial direction of the lid wall 14a to the other side in the axial direction. A portion on one side in the axial direction of the recess 14c is a bearing holding portion 14d that holds the bearing 71 therein.

In the present example embodiment, the inverter unit 80 is attached to the motor housing 11. The inverter unit 80 is fixed to a rear surface of the motor housing 11. Although not illustrated, the inverter unit 80 has an inverter circuit electrically connected to the stator 40.

The transmission housing 12 accommodates the speed-reduction device 61 and the differential device 62 therein. As illustrated in FIG. 2, the transmission housing 12 protrudes on the lower side from the motor housing 11. The bottom located on the lower side of the inner surface of the transmission housing 12 is located on the lower side of the bottom located on the lower side of the inner surface of the motor housing 11. The transmission housing 12 includes a third housing 15 fixed to the first housing 13 and a fourth housing 16 fixed to one side in the axial direction of the third housing 15.

The third housing 15 includes a second opposing wall 15a expanding in the radial direction, a peripheral wall 15b extending from a radially outer peripheral edge portion of the second opposing wall 15a to one side in the axial direction, and bearing holding portions 15c and 15d provided on the second opposing wall 15a. The second opposing wall 15a faces the first opposing wall 13a in the axial direction. The second opposing wall 15a is fixed to one side in the axial direction of the first opposing wall 13a. The second opposing wall 15a has a hole 15f axially penetrating the second opposing wall 15a. The hole 15f has a circular shape centered on the central axis J1. The second shaft member 31b passes through the hole 15f in the axial direction.

The second opposing wall 15a has a recess 15e recessed from the surface on the other side in the axial direction of the second opposing wall 15a toward the one side in the axial direction. The inner peripheral edge of the recess 15e has, for example, a circular shape centered on the central axis J1 when viewed in the axial direction. The opening on the other side in the axial direction of the recess 15e is closed by the first opposing wall 13a. The space S is provided between the first opposing wall 13a and the second opposing wall 15a in the axial direction. The space S is configured by the inside of the recess 15e.

As illustrated in FIG. 2, the second opposing wall 15a has a through hole 15h penetrating the second opposing wall 15a in the axial direction. The through hole 15h is a through hole connecting the space S located between the first opposing wall 13a and the second opposing wall 15a in the axial direction and the inside of the transmission housing 12. The through hole 15h is provided in a portion of the second opposing wall 15a located on the lower side of the bearing holding portion 15c. The through hole 15h is provided at the lower end of the bottom of the recess 15e. The bottom of the recess 15e is a surface located on one side in the axial direction and facing the other side in the axial direction of the inner surface of the recess 15e. The lower end of the through hole 15h is connected to the inner peripheral surface of the recess 15e. For example, the through hole 15h is disposed to face one side in the axial direction of the through hole 13e provided in the first opposing wall 13a with a gap.

In the present example embodiment, the first opposing wall 13a and the second opposing wall 15a constitute a partition wall 19 that separates the inside of the motor housing 11 and the inside of the transmission housing 12. That is, the housing 10 has the partition wall 19. The partition wall 19 has a through hole 19a connecting the inside of the motor housing 11 and the inside of the transmission housing 12. The through hole 19a penetrates the partition wall 19 in the axial direction. In the present example embodiment, the through hole 19a is configured by the through hole 13e provided in the first opposing wall 13a, a lower end of the recess 15e, and the through hole 15h provided in the second opposing wall 15a.

Figure 5:
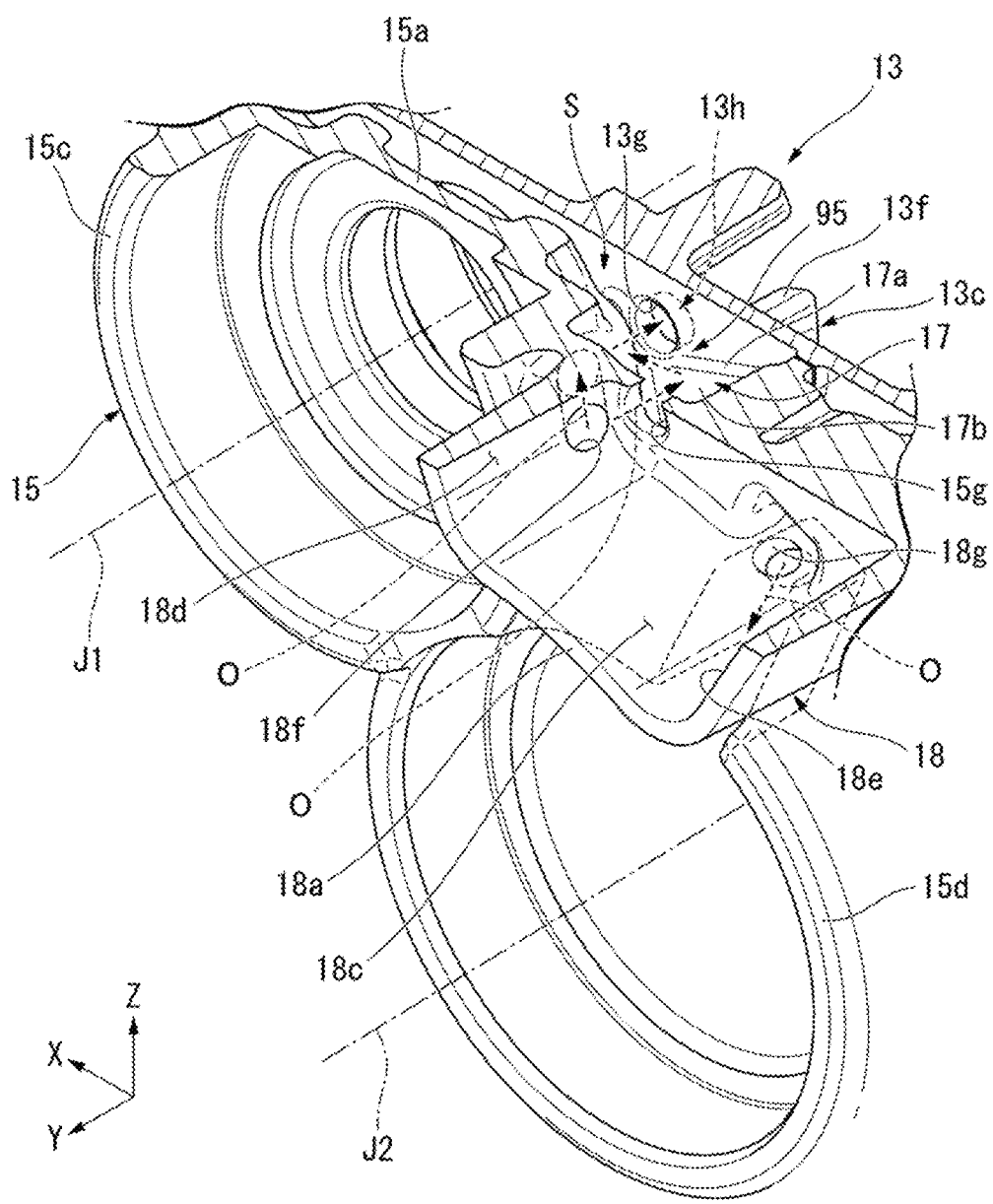
FIG. 5 is a sectional perspective view illustrating a portion of an oil supply path of the first example embodiment.

In the present example embodiment, the bearing holding portions 15c and 15d are provided on the surface on one side in the axial direction of the second opposing wall 15a. The bearing holding portions 15c and 15d protrude to the one side in the axial direction from the surface on the one side in the axial direction of the second opposing wall 15a. As illustrated in FIG. 5, the bearing holding portion 15c has a cylindrical shape centered on the central axis J1. The bearing holding portion 15d has a cylindrical shape centered on the gear axis J2. As illustrated in FIG. 1, the bearing holding portion 15c holds the bearing 73 therein. The bearing holding portion 15d holds the bearing 75 therein.

The fourth housing 16 includes a lid wall 16a expanding in the radial direction, a peripheral wall 16b extending from the radially outer peripheral edge portion of the lid wall 16a to the other side in the axial direction, and bearing holding portions 16c and 16d provided on the lid wall 16a. The end on the other side in the axial direction of the peripheral wall 16b is in contact with the end on one side in the axial direction of the peripheral wall 15b of the third housing 15 in the axial direction.

In the present example embodiment, the bearing holding portions 16c and 16d are provided on the surface on the other side in the axial direction of the lid wall 16a. The bearing holding portions 16c and 16d protrude from the surface on the other side in the axial direction of the lid wall 16a to the other side in the axial direction. Although not illustrated, the bearing holding portion 16c has a cylindrical shape centered on the central axis J1. The bearing holding portion 16d has a cylindrical shape centered on the gear axis J2. The bearing holding portion 16c holds the bearing 74 therein. The bearing holding portion 16d holds the bearing 76 therein.

For example, the oil O is accommodated in the transmission housing 12. The oil O is stored in a lower region in the transmission housing 12. The oil O is used as a refrigerant for cooling the motor 20. The oil O is also used as lubricating oil for the speed-reduction device 61 and the differential device 62. An oil equivalent to a lubricating oil (ATF: Automatic Transmission Fluid) for an automatic transmission having a relatively low viscosity is preferably used as the oil O so that the oil O can perform functions of a lubricating oil and a cooling oil. In the present example embodiment, the oil O corresponds to a second fluid.

In the present example embodiment, the pump 94 is attached to the transmission housing 12. The pump 94 is attached to a lower surface of the transmission housing 12. The pump 94 is a pump that causes the oil O to flow into a second supply flow path 92 described later. In the present example embodiment, the pump 94 is an electric pump. The pump 94 may be a mechanical pump rotated by the shaft 31 or the gear shaft 61d.

Although not illustrated, a space between the first housing 13 and the second housing 14 in the axial direction, a space between the first housing 13 and the third housing 15 in the axial direction, and a space between the third housing 15 and the fourth housing 16 in the axial direction are sealed by seal members. The seal member is, for example, a liquid gasket.

Figure 6:
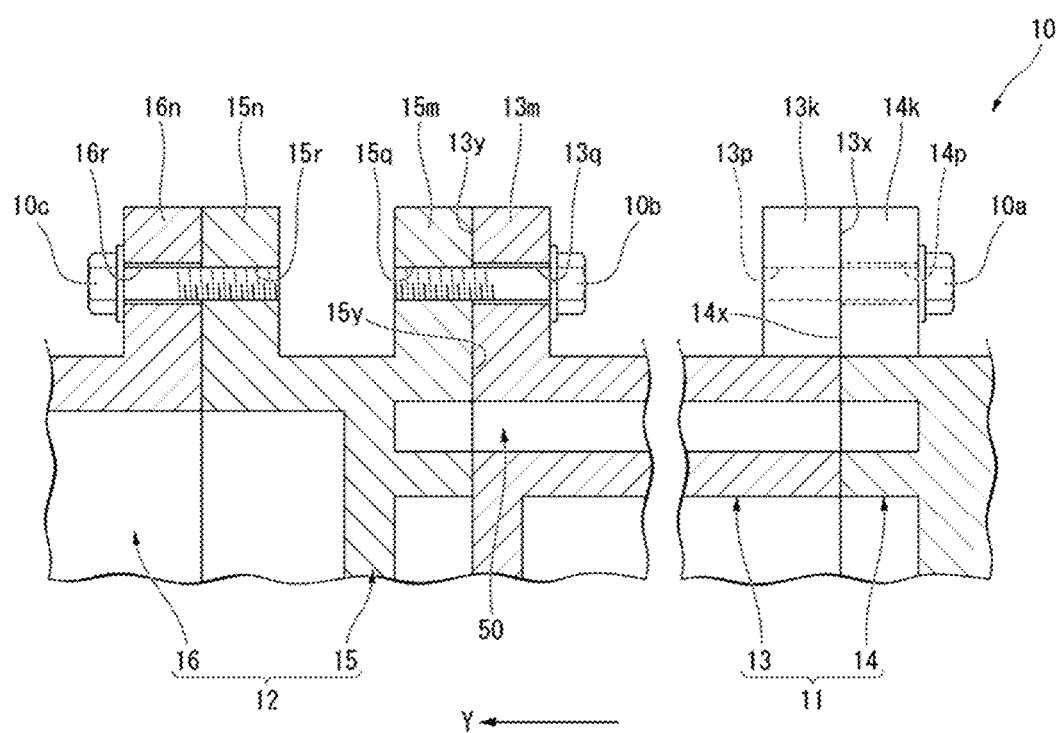
FIG. 6 is a sectional view illustrating a portion of the housing according to the first example embodiment.

In the present example embodiment, the first housing 13, the second housing 14, the third housing 15, and the fourth housing 16 are fixed with bolts. More specifically, as illustrated in FIG. 6, the first housing 13 and the second housing 14 are fixed to each other by a first bolt 10a. The first housing 13 and the third housing 15 are fixed to each other by a second bolt 10b. The third housing 15 and the fourth housing 16 are fixed to each other by a third bolt 10c. A plurality of first bolts 10a, a plurality of second bolts 10b, and a plurality of third bolts 10c are provided so as to surround the central axis J1. That is, the second housing 14 is fixed to the other side in the axial direction of the first housing 13 with the plurality of first bolts 10a. The third housing 15 is fixed to one side in the axial direction of the first housing 13 with the plurality of second bolts 10b. The fourth housing 16 is fixed to one side in the axial direction of the third housing 15 with the plurality of third bolts 10c.

Figure 7:
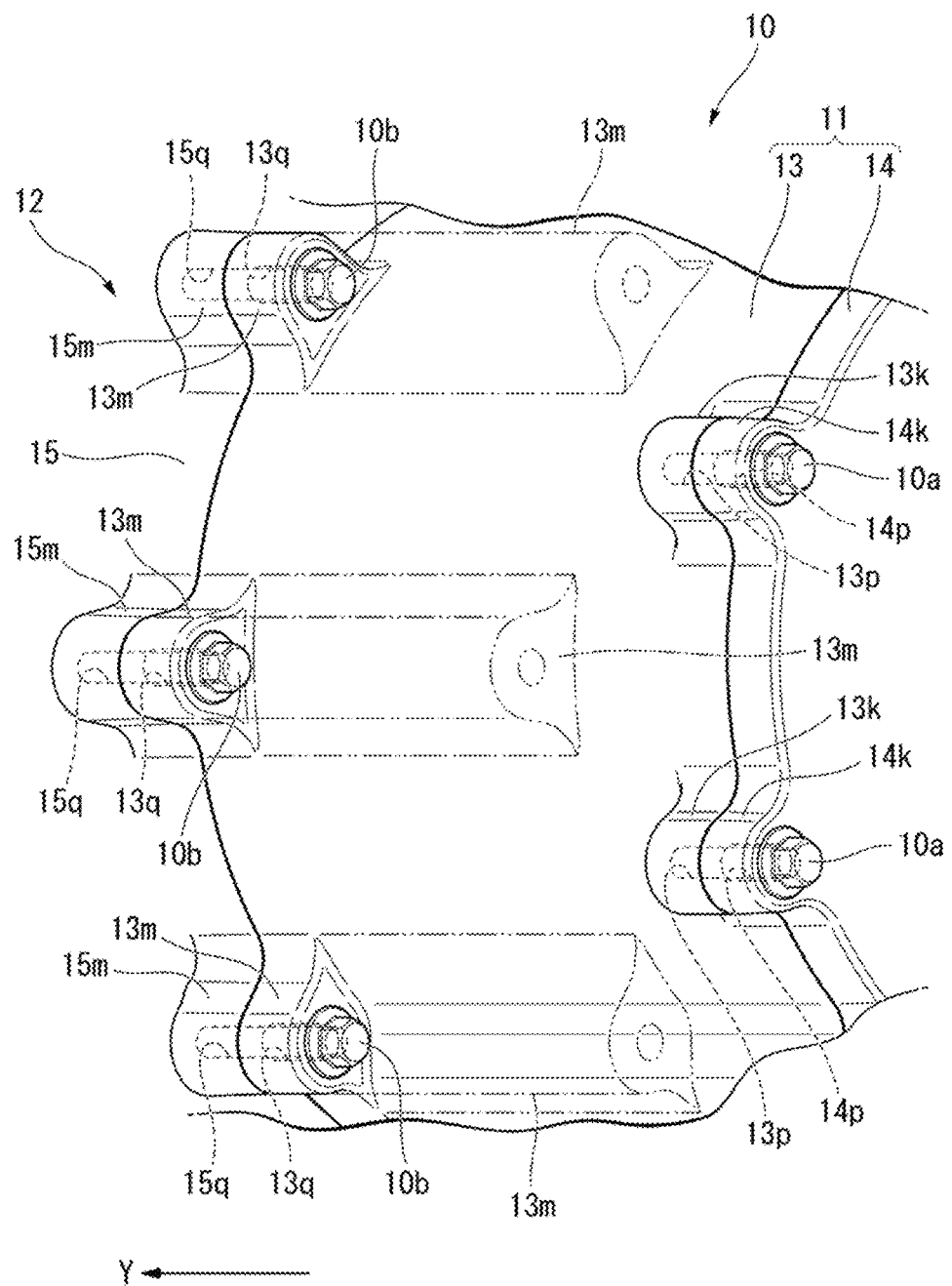
FIG. 7 is a perspective view illustrating a portion of the housing according to the first example embodiment.
Figure 8:
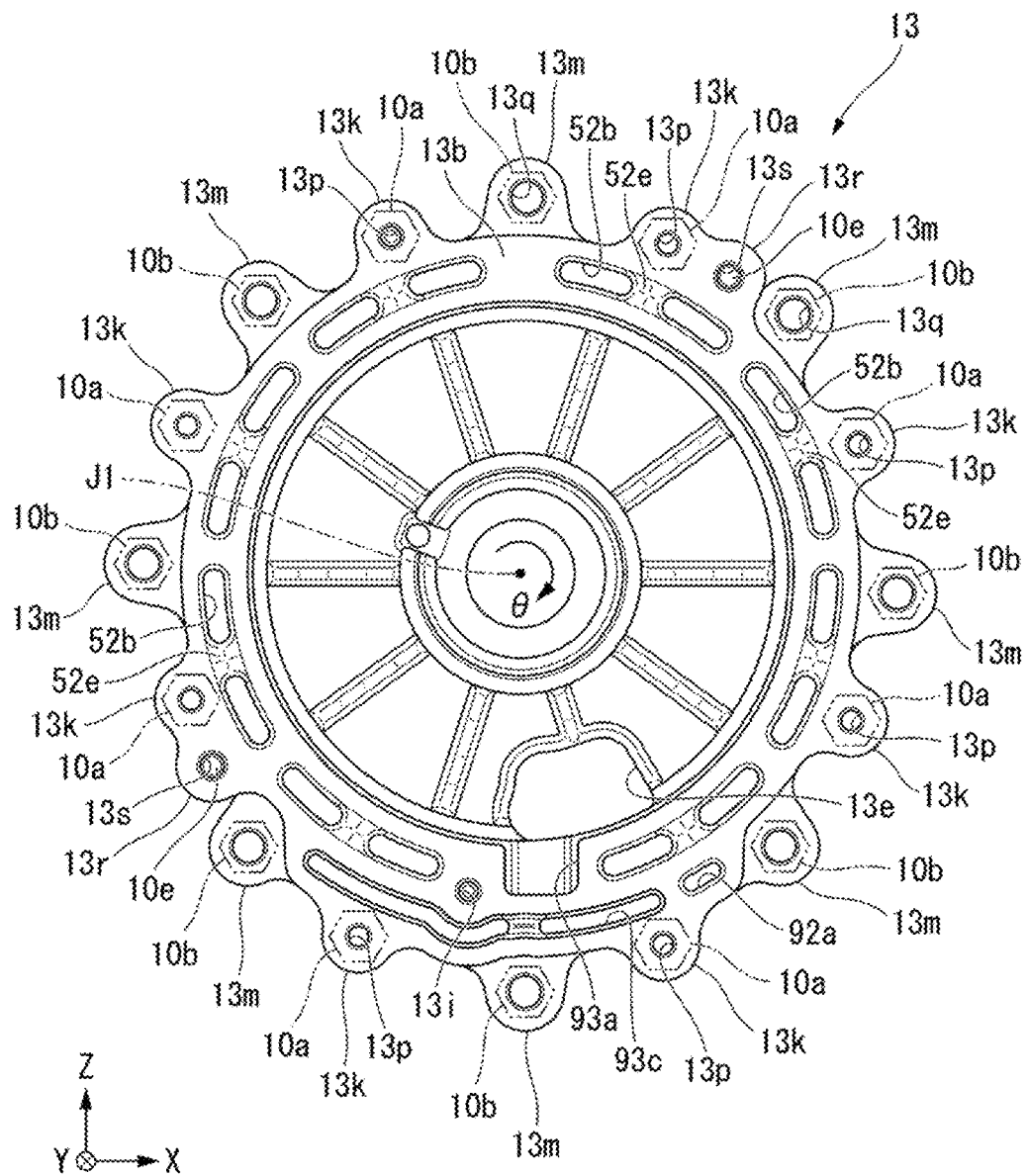
FIG. 8 is a view of the first housing of the motor housing of the first example embodiment as viewed from the another side in the axial direction.

The plurality of first bolts 10a fix a plurality of first protrusions 13k provided on the outer peripheral surface of the first housing 13 and a plurality of second protrusions 14k provided on the outer peripheral surface of the second housing 14, respectively. The first protrusion 13k is provided at the end on the other side in the axial direction of the outer peripheral surface of the first housing 13. The first protrusion 13k protrudes radially outward. As illustrated in FIGS. 7 and 8, the plurality of first protrusions 13k are disposed at intervals along the circumferential direction. As illustrated in FIG. 8, in the present example embodiment, the plurality of first protrusions 13k are disposed at equal intervals over the entire circumference along the circumferential direction. In the present example embodiment, eight first protrusions 13k are provided.

In the present specification, "certain objects are disposed at equal intervals" includes a case where certain objects are disposed at strictly equal intervals and a case where certain objects are disposed at substantially equal intervals.

The first protrusion 13k has a female screw hole 13p recessed from the surface on the other side in the axial direction of the first protrusion 13k to the one side in the axial direction. In the present example embodiment, the female screw hole 13p penetrates the first protrusion 13k in the axial direction. The female screw hole 13p may be a hole having a bottom on one side in the axial direction. One female screw hole 13p is provided for each first protrusion 13k. That is, in the present example embodiment, a total of eight female screw holes 13p are provided. In the present example embodiment, the plurality of female screw holes 13p are disposed at equal intervals over the entire circumference along the circumferential direction.

As illustrated in FIG. 7, the second protrusion 14k is provided at an end on one side in the axial direction of the outer peripheral surface of the second housing 14. The second protrusion 14k protrudes radially outward. The plurality of second protrusions 14k are disposed at intervals along the circumferential direction. Although not illustrated, the plurality of second protrusions 14k are disposed at equal intervals over the entire circumference in the circumferential direction. For example, eight second protrusions 14k are provided. The surface on one side in the axial direction of each second protrusion 14k is in contact with the surface on the other side in the axial direction of each first protrusion 13k.

The second protrusion 14k has a fixing hole 14p axially penetrating the second protrusion 14k. One fixing hole 14p is provided for each of the second protrusions 14k. For example, a total of eight fixing holes 14p are provided. For example, a plurality of fixing holes 14p are disposed at equal intervals over the entire circumference along the circumferential direction. When viewed in the axial direction, each fixing hole 14p and each female screw hole 13p overlap each other. Each of the first bolts 10a passes through each of the fixing holes 14p from the other side in the axial direction and is tightened into each of the female screw holes 13p. Thus, the first housing 13 and the second housing 14 are fixed by the plurality of first bolts 10a. As illustrated in FIG. 8, the plurality of first bolts 10a are disposed at equal intervals over the entire circumference along the circumferential direction around the central axis J1.

As illustrated in FIGS. 6 and 7, the plurality of second bolts 10b fix a plurality of third protrusions 13m provided on the outer peripheral surface of the first housing 13 and a plurality of fourth protrusions 15m provided on the outer peripheral surface of the third housing 15, respectively. The third protrusion 13m is provided at an end on one side in the axial direction of the outer peripheral surface of the first housing 13. The third protrusion 13m protrudes radially outward. The plurality of third protrusions 13m are disposed at intervals along the circumferential direction. As illustrated in FIG. 8, in the present example embodiment, the plurality of third protrusions 13m are disposed at equal intervals over the entire circumference along the circumferential direction. In the present example embodiment, eight third protrusions 13m are provided. The circumferential position of the third protrusion 13m is shifted from the circumferential position of the first protrusion 13k. The circumferential position of the third protrusion 13m is, for example, a circumferential central position between the first protrusions 13k adjacent in the circumferential direction. In the present example embodiment, the plurality of first protrusions 13k and the plurality of third protrusions 13m are alternately disposed along the circumferential direction when viewed in the axial direction.

The third protrusion 13m has a fixing hole 13q axially penetrating the third protrusion 13m. One fixing hole 13q is provided for each third protrusion 13m. That is, in the present example embodiment, a total of eight fixing holes 13q are provided. The plurality of fixing holes 13q are disposed at equal intervals over the entire circumference along the circumferential direction.

As illustrated in FIGS. 6 and 7, the fourth protrusion 15m is provided at the end on the other side in the axial direction of the outer peripheral surface of the third housing 15. The fourth protrusion 15m protrudes radially outward. The plurality of fourth protrusions 15m are disposed at intervals along the circumferential direction. Although not illustrated, the plurality of fourth protrusions 15m are disposed at equal intervals over the entire circumference in the circumferential direction. For example, eight fourth protrusions 15m are provided. The surface on the other side in the axial direction of each of the fourth protrusions 15m is in contact with the surface on one side in the axial direction of each of the third protrusions 13m.

The fourth protrusion 15m has a female screw hole 15q recessed from the surface on the other side in the axial direction of the fourth protrusion 15m to the one side in the axial direction. In the present example embodiment, the female screw hole 15q penetrates the fourth protrusion 15m in the axial direction. The female screw hole 15q may be a hole having a bottom on one side in the axial direction. One female screw hole 15q is provided for each fourth protrusion 15m. For example, a total of eight female screw holes 15q are provided. For example, a plurality of female screw holes 15q are disposed at equal intervals over the entire circumference along the circumferential direction.

When viewed in the axial direction, each fixing hole 13q and each female screw hole 15q overlap each other. Each of the second bolts 10b passes through each of the fixing holes 13q from the other side in the axial direction and is tightened into each of the female screw holes 15q. As a result, the first housing 13 and the third housing 15 are fixed by the plurality of second bolts 10b. As illustrated in FIG. 8, the plurality of second bolts 10b are disposed at equal intervals over the entire circumference along the circumferential direction around the central axis J1. In the present example embodiment, the plurality of first bolts 10a and the plurality of second bolts 10b are alternately disposed along the circumferential direction around the central axis J1 when viewed in the axial direction. Each of the second bolts 10b is located at the center in the circumferential direction between the first bolts 10a adjacent to each other in the circumferential direction as viewed in the axial direction.

As described above, in the present example embodiment, the first housing 13 and the third housing 15 are fixed to each other by the second bolt 10b tightened from the same side as the first bolt 10a that fixes the first housing 13 and the second housing 14. That is, the second bolt 10b for fixing the first housing 13 and the third housing 15 is inserted into the fixing hole 13q and the female screw hole 15q in the same direction as the first bolt 10a for fixing the first housing 13 and the second housing 14.

As illustrated in FIG. 6, the third bolt 10c fixes a fifth protrusion 15n provided at the end on one side in the axial direction of the outer peripheral surface of the third housing 15 and a sixth protrusion 16n provided at the end on the other side in the axial direction of the outer peripheral surface of the fourth housing 16. Although not illustrated, a plurality of fifth protrusions 15n and a plurality of sixth protrusions 16n are provided at intervals in the circumferential direction. The fifth protrusion 15n and the sixth protrusion 16n protrude radially outward. The circumferential positions of the fifth protrusion 15n and the sixth protrusion 16n may be the same as the circumferential positions of the third protrusion 13m and the fourth protrusion 15m, or may be positions shifted in the circumferential direction with respect to the third protrusion 13m and the fourth protrusion 15m.

The fifth protrusion 15n has a female screw hole 15r recessed from the surface on one side in the axial direction of the fifth protrusion 15n to the other side in the axial direction. In the present example embodiment, the female screw hole 15r penetrates the fifth protrusion 15n in the axial direction. The female screw hole 15r may be a hole having a bottom on the other side in the axial direction. The sixth protrusion 16n has a fixing hole 16r axially penetrating the sixth protrusion 16n. Each of the third bolts 10c passes through each of the fixing holes 16r from one side in the axial direction, and is tightened into each of the female screw holes 15r. As a result, the third housing 15 and the fourth housing 16 are fixed by the plurality of third bolts 10c.

As described above, in the present example embodiment, the third housing 15 and the fourth housing 16 are fixed to each other by the third bolt 10c tightened from the side opposite to the side where the first bolt 10a fixing the first housing 13 and the second housing 14 and the second bolt 10b fixing the first housing 13 and the third housing 15 are tightened. That is, the third bolt 10c for fixing the third housing 15 and the fourth housing 16 is inserted into the fixing hole 16r and the female screw hole 15r in a direction different from the first bolt 10a for fixing the first housing 13 and the second housing 14 and the second bolt 10b for fixing the first housing 13 and the third housing 15.

In the present example embodiment, the female screw holes 13p, 13i, 15q, and 15r correspond to bolt holes. In the present example embodiment, the fixing holes 13q, 14e, 14p, and 16r correspond to through holes.

As described above, in the present example embodiment, the first housing 13 and the third housing 15 are fixed by the second bolt 10b from the same side as the side where the first housing 13 and the second housing 14 are fixed by the first bolt 10a in the axial direction. Therefore, the work of fixing the first housing 13 and the second housing 14 and the work of fixing the first housing 13 and the third housing 15 can be performed from the same side in the axial direction, that is, from the other side in the axial direction in the present example embodiment. Accordingly, assembling workability of the housing 10 can be improved.

Here, in the present example embodiment, the transmission housing 12 has a shape protruding radially outward from the motor housing 11. In such a case, when an attempt is made to fix the first housing 13 and the third housing 15 by inserting the bolt from the side where the transmission housing 12 is located with respect to the motor housing 11, that is, from one side in the axial direction, it is necessary to arrange the fixing portion of the bolt on the radially outer side in order to avoid interference with the transmission housing 12 itself. Therefore, the housing 10 tends to be enlarged.

On the other hand, for example, when the first housing 13, the third housing 15, and the fourth housing 16 are fastened together by bolts inserted from one side in the axial direction, the first housing 13 and the third housing 15 can be fixed while suppressing an increase in size of the housing 10. However, in this case, when the bolt is removed to separate the motor housing 11 and the transmission housing 12, the third housing 15 and the fourth housing 16 constituting the transmission housing 12 are also separated. Therefore, in the state of not being fixed to the motor housing 11, the transmission housing 12 cannot be handled in a combined state. As a result, the assemble-ability of the housing 10 tends to deteriorate. In addition, workability tends to deteriorate when performing maintenance of the drive device 100, replacing the transmission 60, and the like.

In addition, the axial force by the bolt necessary for suitably maintaining the sealing property may be different between the seal member provided between the first housing 13 and the third housing 15 in the axial direction and the seal member provided between the third housing 15 and the fourth housing 16 in the axial direction. Therefore, when the first housing 13, the third housing 15, and the fourth housing 16 are fastened together with the same bolt, it may be difficult to suitably apply an axial force to the seal members disposed between the respective housings. Therefore, problems such as a decrease in sealability between the housings and difficulty in adjusting the axial force of the bolt are likely to occur.

The problem in the case of fastening the first housing 13, the third housing 15, and the fourth housing 16 together by the bolt inserted from one side in the axial direction is the same as the problem in the case of fastening the first housing 13, the second housing 14, and the third housing 15 together by the bolt inserted from the other side in the axial direction.

In view of the above problem, according to the present example embodiment, as described above, the first housing 13 and the third housing 15 are fixed by the second bolt 10b from the same side as the side on which the first housing 13 and the second housing 14 are fixed by the first bolt 10a in the axial direction. Therefore, it is possible to suppress the interference of the second bolt 10b with the transmission housing 12 even if the position of the portion fixed by the second bolt 10b is not changed to the more radially outer position. As a result, the first housing 13 and the third housing 15 can be fixed with the second bolt 10b while suppressing an increase in size of the housing 10. Further, even if the second bolt 10b is removed, only the first housing 13 and the third housing 15 are separated, and the third housing 15 and the fourth housing 16 are not separated. Therefore, even in a state where the transmission housing is not fixed to the motor housing 11, the transmission housing 12 can be handled in a combined state. As a result, it is possible to suppress deterioration in assemble-ability of the housing 10. In addition, it is possible to suppress deterioration of workability when performing maintenance of the drive device 100, replacing the transmission 60, and the like. Further, since the axial forces of the second bolt 10b and the third bolt 10c can be changed, different axial forces can be individually applied to the seal member located between the first housing 13 and the third housing 15 and the seal member located between the third housing 15 and the fourth housing 16. As a result, sealability between the housings can be easily secured, and the axial force of the second bolt 10b and the axial force of the third bolt 10c can be easily adjusted. The same applies to the seal member between the first housing 13 and the second housing 14.

In addition, for example, if another housing is disposed between the motor housing 11 and the transmission housing 12 and the motor housing 11 and the transmission housing 12 are fixed to the another housing, the motor housing 11 and the transmission housing 12 can be separated in an assembled state. However, in this case, the number of components constituting the housing 10 increases by the provision of the other housing. On the other hand, according to the present example embodiment, as described above, it is possible to separate the motor housing 11 and the transmission housing 12 in an assembled state without providing the other members. Therefore, it is possible to suppress an increase in the number of components constituting the housing 10. In addition, since it is not necessary to provide the other member, the weight of the drive device 100 can be reduced. As a result, even when the structure of the drive device 100 is a water-cooled structure in which the motor 20 is cooled by water W as in the present example embodiment, it is possible to suppress an increase in the weight of the entire drive device 100.

According to the present example embodiment, the plurality of first bolts 10a that fix the first housing 13 and the second housing 14 fix the plurality of first protrusions 13k provided on the outer peripheral surface of the first housing 13 and the plurality of second protrusions 14k provided on the outer peripheral surface of the second housing 14, respectively. In this manner, by providing the first protrusion 13$k$ and the second protrusion 14$k$ partially protruding on the outer peripheral surface of each housing and fixing the first protrusion 13$k$ and the second protrusion 14$k$ by the first bolt 10$a$, it is possible to suppress an increase in size of the first housing 13 and the second housing 14 in the radial direction over the entire circumference.

According to the present example embodiment, the plurality of second bolts 10$b$ for fixing the first housing 13 and the third housing 15 fix the plurality of third protrusions 13$m$ provided on the outer peripheral surface of the first housing 13 and the plurality of fourth protrusions 15$m$ provided on the outer peripheral surface of the third housing 15, respectively. In this manner, by providing the third protrusion 13$m$ and the fourth protrusion 15$m$ partially protruding on the outer peripheral surface of each housing and fixing the third protrusion 13$m$ and the fourth protrusion 15$m$ by the second bolt 10$b$, it is possible to suppress an increase in size of the first housing 13 and the third housing 15 in the radial direction over the entire circumference.

According to the present example embodiment, the plurality of first bolts 10$a$ and the plurality of second bolts 10$b$ are alternately disposed along the circumferential direction around the central axis J1 as viewed in the axial direction. Therefore, while the plurality of first bolts 10$a$ and the plurality of second bolts 10$b$ are disposed along the circumferential direction to stably fix the first housing 13, the second housing 14, and the third housing 15, it is possible to prevent one of the first bolt 10$a$ and the second bolt 10$b$ from interfering with the other. As a result, when the work of fixing the first housing 13 and the second housing 14 by the first bolt 10$a$ and the work of fixing the first housing 13 and the third housing 15 by the second bolt 10$b$ are performed from the same side in the axial direction, it is easy to perform each work. Therefore, the assemble-ability of the housing 10 can be improved.

According to the present example embodiment, the plurality of first bolts 10$a$ are disposed at equal intervals over the entire circumference along the circumferential direction around the central axis J1. Therefore, the first housing 13 and the second housing 14 can be more stably fixed by the plurality of first bolts 10$a$. In addition, it is easy to make the axial force applied by the plurality of first bolts 10$a$ to the seal member located between the first housing 13 and the second housing 14 uniform over the entire circumferential direction. As a result, it is easy to suitably seal between the first housing 13 and the second housing 14 over the entire circumference.

According to the present example embodiment, the plurality of second bolts 10$b$ are disposed at equal intervals over the entire circumference along the circumferential direction around the central axis J1. Therefore, the first housing 13 and the third housing 15 can be more stably fixed by the plurality of second bolts 10$b$. In addition, it is easy to make the axial force applied by the plurality of second bolts 10$b$ to the seal member located between the first housing 13 and the third housing 15 uniform over the entire circumferential direction. As a result, it is easy to suitably seal between the first housing 13 and the third housing 15 over the entire circumference.

As indicated by a two-dot chain line in FIG. 7, the third protrusion 13$m$ provided in the first housing 13 may extend in the axial direction. In this case, the end on the other side in the axial direction of the third protrusion 13$m$ can be brought close to the first protrusion 13$k$. As a result, when the work of fixing the first housing 13 and the third housing 15 is performed from the other side in the axial direction, the position where a jig and a tool for fastening the second bolt 10$b$ are used can be brought close to the position where the jig and the tool are used when the work of fixing the first housing 13 and the second housing 14 is performed. In addition, axial dimensions of the jig and the tool can be shortened. Thus, the workability of the work of fixing the first housing 13 and the third housing 15 with the second bolt 10$b$ can be improved. In particular, the second bolt 10$b$ can be suitably tightened to suitably generate the axial force.

The end on the other side in the axial direction of the third protrusion 13$m$ indicated by a two-dot chain line in FIG. 7 is located, for example, on the other side in the axial direction with respect to the center in the axial direction of the first housing 13. The end on the other side in the axial direction of the third protrusion 13$m$ indicated by a two-dot chain line in FIG. 7 is located, for example, on the one side in the axial direction with respect to the end on the one side in the axial direction of the first protrusion 13$k$. Thus, the third protrusion 13$m$ can be prevented from interfering with the first protrusion 13$k$.

As illustrated in FIGS. 3 and 4, in the present example embodiment, the first housing 13 and the second housing 14 are also fixed by a fourth bolt 10$d$ different from the plurality of first bolts 10$a$ described above. As illustrated in FIG. 3, the first housing 13 has a female screw hole 13$i$ recessed from the end surface on the other side in the axial direction of the peripheral wall 13$b$ toward the one side in the axial direction. The female screw hole 13$i$ is located between a groove portion 93$a$ to be described later and a second circumferential flow path portion 52$b$ of a first flow path 50 to be described later in the circumferential direction. The female screw hole 13$i$ is located radially inside a collection flow path body 93$c$ described later.

As illustrated in FIG. 4, the second housing 14 has a fixing hole 14$e$ penetrating the second housing 14 in the axial direction. The fixing hole 14$e$ is located between a connection portion 93$b$ to be described later and the second circumferential flow path portion 52$b$ of the first flow path 50 to be described later in the circumferential direction. The fixing hole 14$e$ is located radially inside the collection flow path body 93$c$ described later. The fourth bolt 10$d$ passed through the fixing hole 14$e$ from the other side in the axial direction is tightened into the female screw hole 13$i$. Thus, in the present example embodiment, the first housing 13 and the second housing 14 are fixed to each other at positions radially inside the collection flow path 93 to be described later and adjacent to the first flow path 50 in the circumferential direction.

Figure 9:
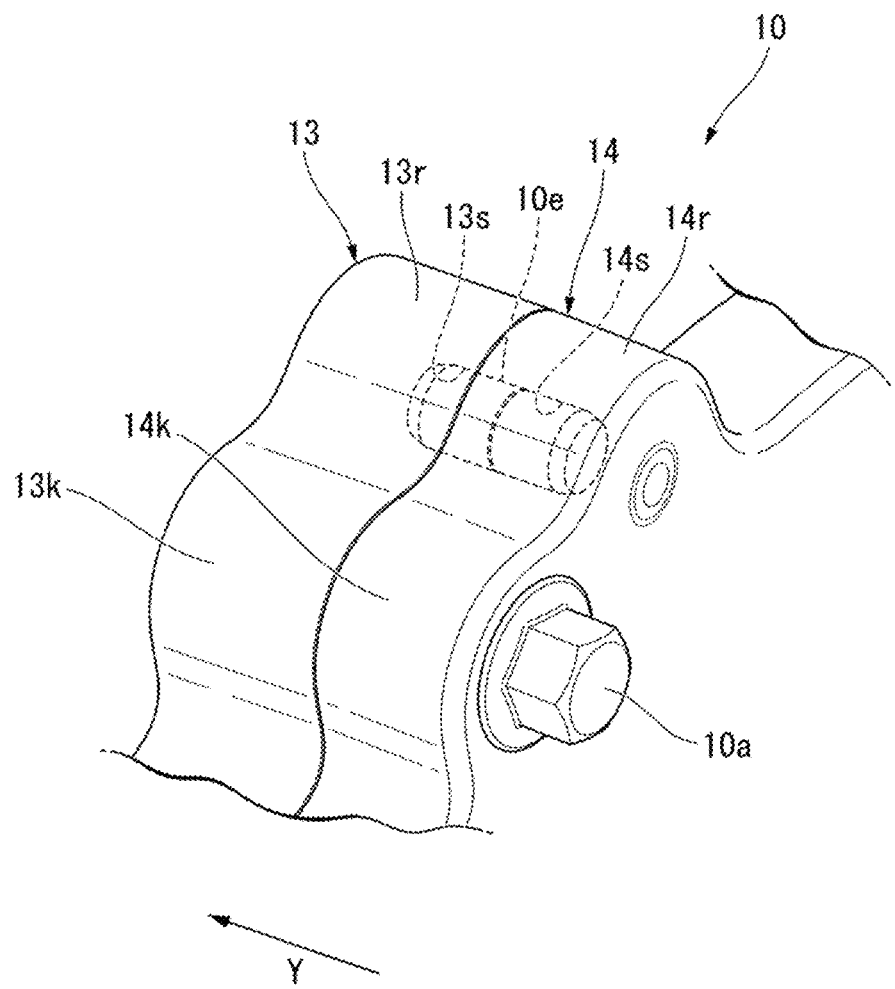
FIG. 9 is a perspective view illustrating a positioning portion of the first example embodiment.

As illustrated in FIG. 9, the first housing 13 has a positioning protrusion 13$r$ provided on the outer peripheral surface of the first housing 13. The second housing 14 has a positioning protrusion 14$r$ provided on the outer peripheral surface of the second housing 14. The positioning protrusions 13$r$ and 14$r$ protrude radially outward. The positioning protrusion 13$r$ has a hole 13$s$ recessed from the surface on the other side in the axial direction of the positioning protrusion 13$r$ to the one side in the axial direction. The hole 13$s$ is a circular hole having a bottom on one side in the axial direction. The positioning protrusion 14$r$ has a hole 14$s$ recessed from the surface on one side in the axial direction of the positioning protrusion 14$r$ to the other side in the axial direction. The hole 14$s$ is a circular hole having a bottom on the other side in the axial direction. The hole 13$s$ and the hole 14$s$ face each other in the axial direction.

The positioning protrusion 13$r$ is connected to one first protrusion 13$k$ in the circumferential direction. The positioning protrusion 14$r$ is connected to one second protrusion 14k in the circumferential direction. The positioning protrusion 13r and the positioning protrusion 14r are in contact with each other in the axial direction. As illustrated in FIG. 8, in the present example embodiment, two positioning protrusions 13r are provided at intervals in the circumferential direction. The two positioning protrusions 13r are provided at positions substantially opposite to each other across the central axis J1 in the radial direction. Although not illustrated, two positioning protrusions 14r are provided at intervals in the circumferential direction similarly to the positioning protrusions 13r.

As illustrated in FIG. 9, in the present example embodiment, the housing 10 includes a positioning pin 10e that positions the first housing 13 and the second housing 14 in the circumferential direction. The positioning pin 10e has a columnar shape extending in the axial direction. The positioning pin 10e is fitted in both the hole 13s provided in the positioning protrusion 13r of the first housing 13 and the hole 14s provided in the positioning protrusion 14r of the second housing 14. As a result, the first housing 13 and the second housing 14 are located in the circumferential direction.

A portion on one side in the axial direction of the positioning pin 10e is fitted in the hole 13s. A portion on the other side in the axial direction of the positioning pin 10e is fitted in the hole 14s. As illustrated in FIG. 8, two positioning pins 10e are provided in the present example embodiment. The two positioning pins 10e are provided at positions substantially opposite to each other across the central axis J1.

Figure 12:
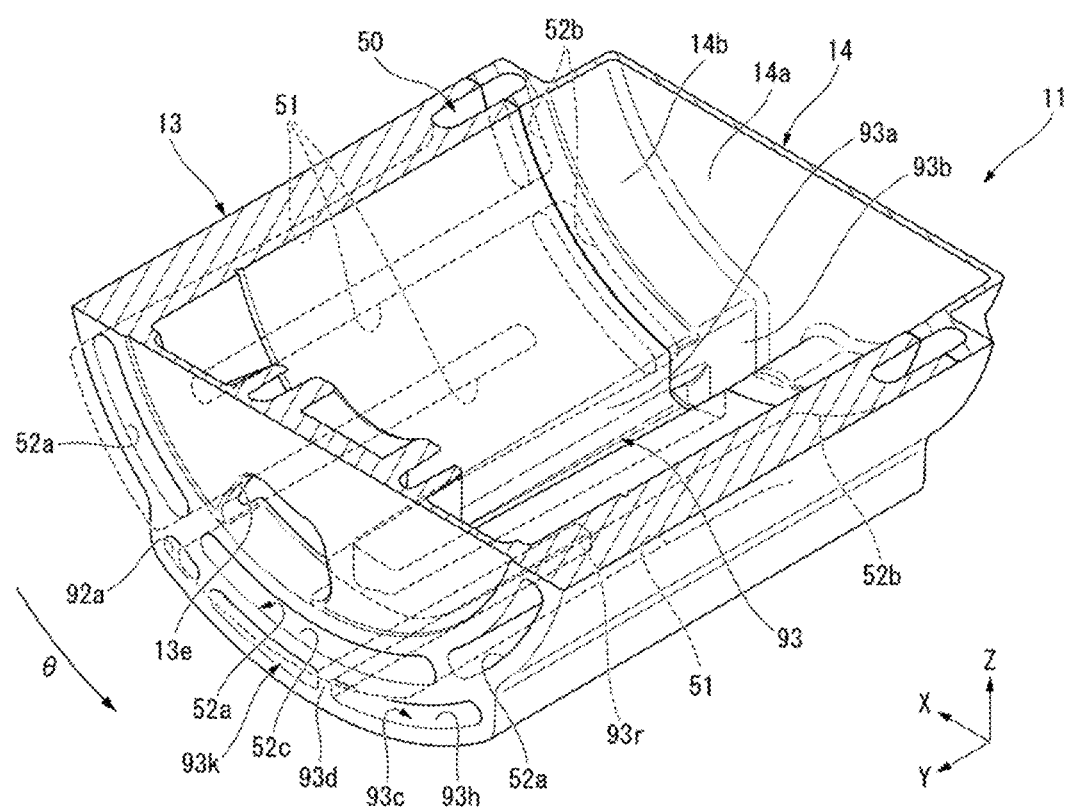
FIG. 12 is a sectional perspective view illustrating a portion of the motor housing according to the first example embodiment.

In FIGS. 1 and 2, illustration of the first protrusion 13k, the second protrusion 14k, the third protrusion 13m, the fourth protrusion 15m, the fifth protrusion 15n, the sixth protrusion 16n, and the positioning protrusions 13r and 14r is omitted. In FIG. 3, illustration of the first protrusion 13k and the positioning protrusion 13r is omitted. In FIG. 4, illustration of the second protrusion 14k and the positioning protrusion 14r is omitted. In FIG. 12, illustration of the first protrusion 13k, the second protrusion 14k, the third protrusion 13m, and the positioning protrusions 13r and 14r is omitted.

Figure 10:
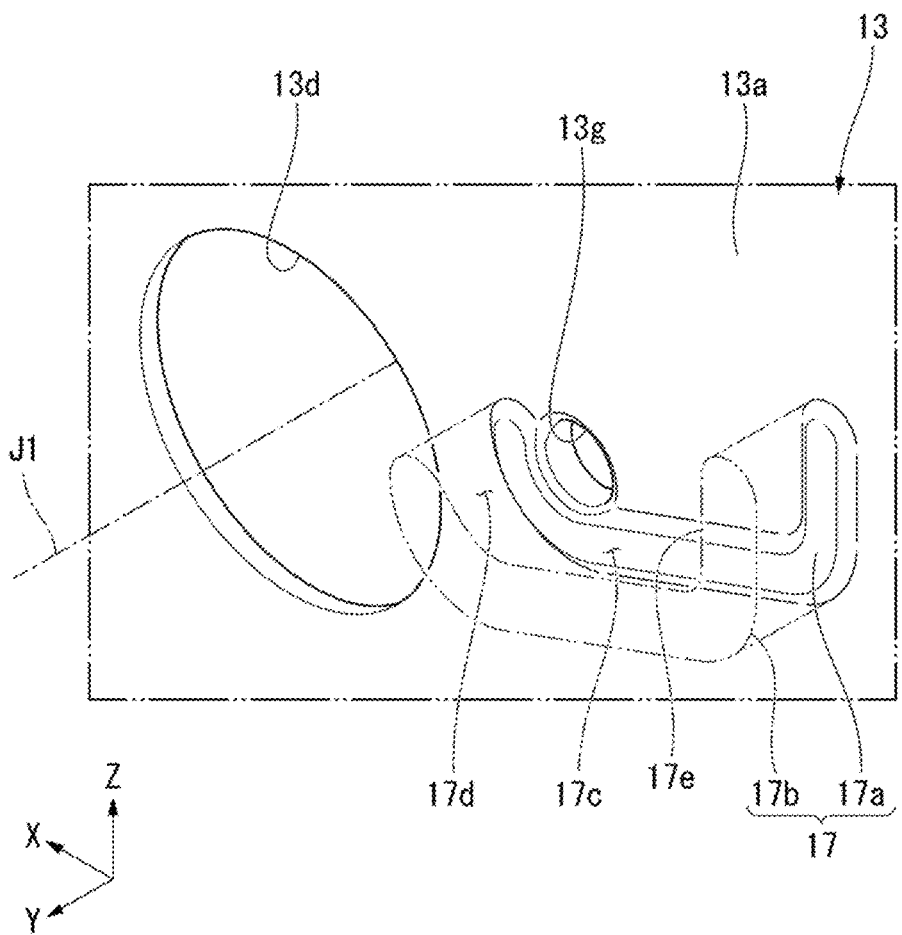
FIG. 10 is a perspective view illustrating a first gutter portion of the first example embodiment.

As illustrated in FIG. 2, the housing 10 has a first gutter portion 17. The first gutter portion 17 is located between the first opposing wall 13a and the second opposing wall 15a in the axial direction. That is, the first gutter portion 17 is located in the space S. As illustrated in FIG. 10, the first gutter portion 17 has a gutter shape that opens upward and extends in the axial direction. The oil O flows into the first gutter portion 17. The first gutter portion 17 is a reservoir capable of storing the oil O therein. In the present example embodiment, the first gutter portion 17 is located on the rear side (−X side) of the central axis J1. The first gutter portion 17 is located behind the hole 13d.

The first gutter portion 17 connects the first opposing wall 13a and the second opposing wall 15a. In the present example embodiment, the first gutter portion 17 has a first portion 17a protruding to one side in the axial direction from a surface on one side (+Y side) in the axial direction of the first opposing wall 13a, and a second portion 17b protruding to the other side in the axial direction from a surface on the other side (−Y side) in the axial direction of the second opposing wall 15a. The end on one side in the axial direction of the first portion 17a and the end on the other side in the axial direction of the second portion 17b are connected to each other. The axial dimension of the second portion 17b is larger than the axial dimension of the first portion 17a.

The first gutter portion 17 has a bottom 17c facing upward, and a pair of side surfaces 17d and 17e protruding upward from both sides of the bottom 17c in the front-rear direction. The bottom 17c and the pair of side surfaces 17d and 17e extend in the axial direction. The bottom 17c and the pair of side surfaces 17d and 17e connect the first opposing wall 13a and the second opposing wall 15a. The pair of side surfaces 17d and 17e is disposed to face each other at an interval in the axial direction. The side surface 17d is located on the front side (+X side) of the side surface 17e.

The bottom 17c is inclined in the vertical direction with respect to the front-rear direction. The bottom 17c is located on the lower side toward the front side (+X side). In the present example embodiment, the bottom 17c is an inclined surface located on the lower side as approaching a first hole 13g provided in the first opposing wall 13a. Therefore, it is easy to guide the oil O in the first gutter portion 17 into the first hole 13g along the bottom 17c using gravity. The first hole 13g penetrates the first opposing wall 13a in the axial direction. The first hole 13g is, for example, a circular hole. The first hole 13g opens at the front end of the inside of the first gutter portion 17. The first hole 13g is connected to the bottom 17c and the side surface 17d.

As illustrated in FIG. 5, the first gutter portion 17 is connected to a portion located on the lower side of the first hole 13g in the surface on one side in the axial direction of the first opposing wall 13a and a portion located on the lower side of the second hole 15g in the surface on the other side in the axial direction of the second opposing wall 15a. The second hole 15g penetrates the second opposing wall 15a in the axial direction. The second hole 15g is, for example, a circular hole. The second hole 15g opens at the end on a rear side (−X side) of the inside of the first gutter portion 17 and the end on a front side (+X side) of the inside of a second gutter portion 18.

Figure 11:
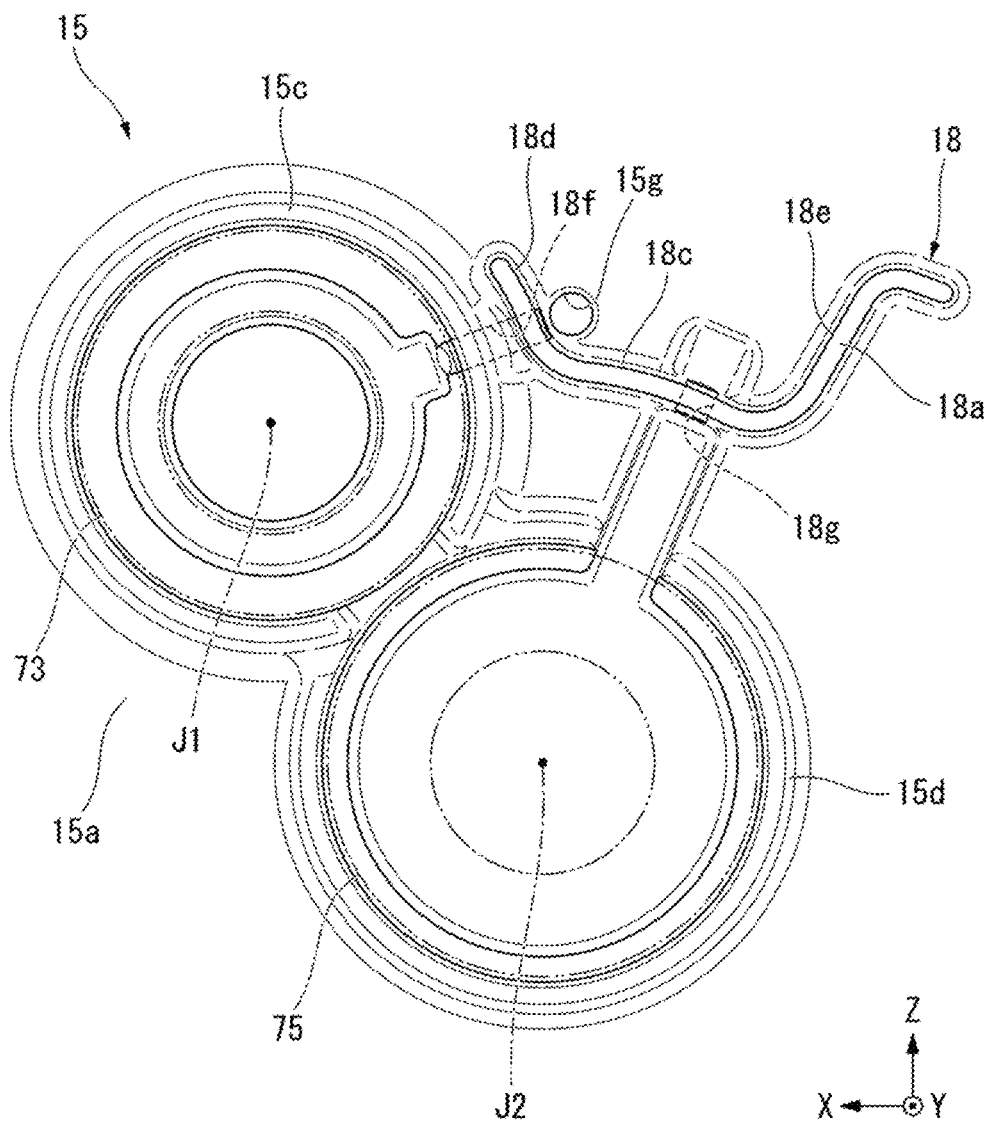
FIG. 11 is a view of a second gutter portion of the first example embodiment as viewed from one side in the axial direction.

As illustrated in FIG. 2, the housing 10 has the second gutter portion 18. The second gutter portion 18 is located inside the transmission housing 12. As illustrated in FIGS. 5 and 11, the second gutter portion 18 has a gutter shape that opens upward and extends in the axial direction. The oil O flows into the second gutter portion 18. The second gutter portion 18 is a reservoir capable of storing the oil O therein. In the present example embodiment, the second gutter portion 18 is located on the rear side (−X side) of the central axis J1. The second gutter portion 18 is located above the bearing holding portion 15d. As illustrated in FIG. 5, the end on the front (+X side) side of the second gutter portion 18 is located on one side (+Y side) in the axial direction of the rear end of the first gutter portion 17.

As illustrated in FIG. 2, the second gutter portion 18 connects the second opposing wall 15a and the lid wall 16a. In the present example embodiment, the second gutter portion 18 has a first portion 18a protruding to one side in the axial direction from a surface on one side (+Y side) in the axial direction of the second opposing wall 15a, and a second portion 18b protruding to the other side in the axial direction from a surface on the other side (−Y side) in the axial direction of the lid wall 16a. The end on one side in the axial direction of the first portion 18a and the end on the other side in the axial direction of the second portion 18b are connected to each other.

As illustrated in FIG. 11, the second gutter portion 18 has a bottom 18c facing upward, and a pair of side surfaces 18d and 18e protruding upward from both sides of the bottom 18c in the front-rear direction. The bottom 18c and the pair of side surfaces 18d and 18e extend in the axial direction. The bottom 18c and the pair of side surfaces 18d and 18e connect the second opposing wall 15a and the lid wall 16a. The pair of side surfaces 18d and 18e are disposed to face each other at an interval in the axial direction.

The side surface 18d is located on the front side (+X side) of the side surface 18e. The side surface 18d is inclined in the front-rear direction with respect to the vertical direction. The side surface 18d is located on the front side (+X side) as it goes upward. In the present example embodiment, the side surface 18d is an inclined surface located on the lower side as approaching the second hole 15g. Therefore, the oil O that has entered the second gutter portion 18 is easily guided to the inside of the second hole 15g along the side surface 18d using gravity.

The side surface 18e is inclined in the front-rear direction with respect to the vertical direction. The side surface 18d is located on the rear side (−X side) as it goes upward. The bottom 18c is inclined in the vertical direction with respect to the front-rear direction. The bottom 18c is located on the lower side toward the rear side (−X side).

As illustrated in FIG. 5, the second gutter portion 18 is connected to a portion located on the lower side of the second hole 15g in the surface on one side in the axial direction of the second opposing wall 15a. The second gutter portion 18 is provided with supply holes 18f and 18g. The supply hole 18f connects the inside of the second gutter portion 18 and the inside of the bearing holding portion 15c. Therefore, a part of the oil O entering the second gutter portion 18 is supplied to a bearing 73 in the bearing holding portion 15c via the supply hole 18f. As illustrated in FIG. 11, the supply hole 18f opens to the side surface 18d. The supply hole 18f extends forward (+X side) and obliquely on the lower side from the side surface 18d.

The supply hole 18g connects the inside of the second gutter portion 18 and the inside of the bearing holding portion 15d. Therefore, a part of the oil O entering the second gutter portion 18 is supplied to the bearing 75 in the bearing holding portion 15d via the supply hole 18g. The supply hole 18g is open to the bottom 18c. The supply hole 18g extends on the lower side and obliquely forward (+X side) from the bottom 18c.

As illustrated in FIG. 2, the housing 10 includes the first flow path 50 and a second flow path 90. The first flow path 50 is a flow path through which the water W as a first fluid flows. The second flow path 90 is a flow path through which the oil O as a second fluid flows. In the present example embodiment, the oil O and the water W function as a refrigerant for cooling the stator 40. That is, in the present example embodiment, the first flow path 50 and the second flow path 90 are flow paths through which the water W as a refrigerant for cooling the stator 40 flows. In the present example embodiment, at least a part of the first flow path 50 and at least a part of the second flow path 90 are configured by the first housing 13, the second housing 14, and the third housing 15. Therefore, the axial range in which the first flow path 50 and the second flow path 90 are provided can be easily increased, and the stator 40 can be easily cooled.

In the present specification, the "flow path" means a path through which a fluid flows. Therefore, the concept of "flow path" includes not only a "flow path", in which a steady flow of a fluid in one direction is generated, but also a channel in which the fluid is allowed to temporarily stay, and a channel along which the fluid drips. Examples of the channel in which the fluid is allowed to temporarily stay include a reservoir or the like arranged to store the fluid.

At least a part of the second flow path 90 is configured by the first housing 13 and the third housing 15. In the present example embodiment, the second flow path 90 includes the first housing 13, the second housing 14, and the third housing 15. The second flow path 90 includes a first supply flow path 91, a second supply flow path 92, and a collection flow path 93. The first supply flow path 91 and the second supply flow path 92 are supply flow paths for supplying the oil O in the transmission housing 12 to the inside of the motor housing 11.

The first supply flow path 91 includes a scraping-up channel 91a, a shaft supply channel 91b, an intra-shaft channel 91c, and an intra-rotor channel 90a. The scraping-up channel 91a is a path in which the oil O in the transmission housing 12 is scraped up by the rotation of the ring gear 62a of the differential device 62 and enters the second gutter portion 18. The shaft supply channel 91b is a path through which the oil O in the second gutter portion 18 flows into the bearing holding portion 16c through a flow path (not illustrated) provided in the lid wall 16a and flows into the shaft 31 from the bearing holding portion 16c. When the oil O flows into the bearing holding portion 16c in the shaft supply channel 91b, the oil O is supplied to the bearing 74 held by the bearing holding portion 16c. In the shaft supply channel 91b of the present example embodiment, the oil O flows in from the end on one side in the axial direction of the shaft 31.

The intra-shaft channel 91c is a path through which the oil O flowing into the shaft 31 from the end on one side in the axial direction of the shaft 31 flows to the other side in the axial direction in the shaft 31. The intra-rotor channel 90a is a path for the oil O in the shaft 31 to pass through the inside of the rotor body 32 from the hole 33 and to be scattered to the stator 40. In this manner, the oil O is supplied to the rotor 30 and the stator 40 by the first supply flow path 91.

As illustrated in FIG. 1, the second supply flow path 92 includes an introduction flow path portion 92a, a connecting flow path portion 92b, an intra-shaft channel 92c, and the intra-rotor channel 90a. The introduction flow path portion 92a extends in the axial direction from the inside of the transmission housing 12. More specifically, the introduction flow path portion 92a extends from the inside of the transmission housing 12 to the other side in the axial direction, passes through the second opposing wall 15a, the first opposing wall 13a, and the peripheral wall 13b, and extends to the second housing 14. That is, the introduction flow path portion 92a includes a flow path portion 92d provided in the first housing 13, a flow path portion 92e provided in the second housing 14, and a flow path portion 92f provided in the third housing 15.

In the present example embodiment, the flow path portion 92d corresponds to a "first portion", and the flow path portion 92f corresponds to a "third portion". That is, in the present example embodiment, the second flow path 90 has the flow path portion 92d as the first portion and the flow path portion 92f as the second portion. The flow path portion 92f as the second portion is connected to one side in the axial direction of the flow path portion 92d as the first portion. Therefore, the second flow path 90 can be suitably enlarged in the axial direction by the flow path portion 92d and the flow path portion 92f. The flow path portion 92e is connected to the other side in the axial direction of the flow path portion 92d. Therefore, the second flow path 90 can be more suitably enlarged in the axial direction by the flow path portion 92d and the flow path portion 92e. The flow path portion 92f as the second portion penetrates the second opposing wall 15a in the axial direction and opens to the inside of the transmission housing 12. Therefore, the oil O in the transmission housing 12 can flow into the introduction flow path portion 92a from the flow path portion 92f. The oil O sucked from the inside of the transmission housing 12 by the pump 94 flows into the introduction flow path portion 92a. In the introduction flow path portion 92a, the oil O flows to the other side in the axial direction.

As illustrated in FIG. 3, a cross section of the flow path of the introduction flow path portion 92a has an oval shape elongated in the circumferential direction. The circumferential dimension of the introduction flow path portion 92a is smaller than the circumferential dimension of the collection flow path body 93c to be described later, the circumferential dimension of a first circumferential flow path portion 52a to be described later, and the circumferential dimension of a second circumferential flow path portion 52b to be described later. Therefore, the circumferential dimension of the introduction flow path portion 92a can be made relatively small. As a result, the pressure loss generated in the oil O flowing in the introduction flow path portion 92a can be reduced. Therefore, the oil O can be easily fed into the introduction flow path portion 92a by the pump 94.

For example, the introduction flow path portion 92a is located on the front side (+X side) and the lower side with respect to the central axis J1. At least a part of the introduction flow path portion 92a is located radially outside the first flow path 50. In the present example embodiment, almost the entire introduction flow path portion 92a except for both axial ends is located radially outside the first flow path 50. The introduction flow path portion 92a is located on the lower side of the first flow path 50.

As illustrated in FIG. 1, the connecting flow path portion 92b is provided in the lid wall 14a of the second housing 14. The connecting flow path portion 92b extends upward from an end on the other side in the axial direction of the introduction flow path portion 92a, and is connected to recess 14c. As a result, the oil O flows into the recess 14c. Part of the oil O flowing into the recess 14c is supplied to the bearing 71 held by the bearing holding portion 14d. The other part of the oil O flowing into the recess 14c flows into the shaft 31 from the other side in the axial direction. The intra-shaft channel 92c is a path through which the oil O flowing into the shaft 31 from the end on the other side in the axial direction of the shaft 31 flows to one side in the axial direction in the shaft 31. As described above, in the present example embodiment, the oil O flows into the shaft 31 from both sides in the axial direction by the first supply flow path 91 and the second supply flow path 92. Therefore, for example, as compared with a case where the oil O flows in only from one end in the shaft 31, the oil O can be suitably flown to the entire shaft 31 in the axial direction. That is, it is possible to suppress that the oil O flowing in from one end in the shaft 31 does not reach the other end in the shaft 31 and does not flow to the entire inside of the shaft 31. Therefore, it is easy to suitably supply the oil O to each of the bearings 71 and 74 supporting both axial ends of the shaft 31. The oil O flowing through the intra-shaft channel 92c flows through the intra-rotor channel 90a and is supplied to the rotor 30 and the stator 40, similarly to the intra-shaft channel 91c.

The oil O supplied to the stator 40 takes heat from the stator 40 by the first supply flow path 91 and the second supply flow path 92. The oil O that has cooled the stator 40 falls on a lower side and accumulates in a lower region in the motor housing 11. The oil O accumulated in the lower region in the motor housing 11 returns to the inside of the transmission housing 12 via the through hole 19a of the partition wall 19 or the collection flow path 93.

As illustrated in FIG. 2, the collection flow path 93 extends from the inside of the motor housing 11 to the inside of the transmission housing 12. In the present example embodiment, the collection flow path 93 is provided across the third housing 15, the first housing 13, and the second housing 14. The collection flow path 93 is located on the lower side of the motor 20. The collection flow path 93 includes the groove portion 93a, the connection portion 93b, and the collection flow path body 93c. The groove portion 93a is provided on the inner peripheral surface of the motor housing 11. In the present example embodiment, the groove portion 93a is recessed on the lower side from a portion located on the lower side of the inner peripheral surface of the first housing 13. The groove portion 93a extends in the axial direction. The end on one side in the axial direction of the groove portion 93a is closed. The end on the other side in the axial direction of the groove portion 93a is open to the end surface on the other side in the axial direction of the peripheral wall 13b. The end on the other side in the axial direction of the groove portion 93a is connected to the connection portion 93b.

The bottom of the groove portion 93a is located on the lower side toward the other side in the axial direction. That is, the bottom of the groove portion 93a is an inclined surface located on the lower side toward the connection portion 93b. Therefore, the oil O entering the groove portion 93a can be easily guided to the connection portion 93b along the bottom of the groove portion 93a using gravity. The bottom of the groove portion 93a is a surface that is located on the radially outer side of the inner surface of the groove portion 93a and faces the radially inner side. In the present example embodiment, the bottom of the groove portion 93a faces upward. As illustrated in FIG. 12, the circumferential dimension of the groove portion 93a is smaller than the circumferential dimension of the through hole 13e.

The connection portion 93b connects the groove portion 93a and the collection flow path body 93c. The connection portion 93b is connected to an end 93f on the other side in the axial direction of the groove portion 93a. In the present example embodiment, the connection portion 93b is provided on the peripheral wall 14b of the second housing 14. The connection portion 93b extends on the lower side from a portion located on the lower side of the inner peripheral surface of the peripheral wall 14b. The connection portion 93b opens upward. As illustrated in FIG. 2, the lower end of the connection portion 93b is connected to an end 93g on the other side in the axial direction of the collection flow path body 93c. As a result, the connection portion 93b connects the end 93f on the other side in the axial direction of the groove portion 93a and the end 93g on the other side in the axial direction of the collection flow path body 93c.

The collection flow path body 93c is located radially outside the groove portion 93a. In the present example embodiment, the collection flow path body 93c is located on the lower side of the groove portion 93a. The collection flow path body 93c extends in the axial direction and is connected to the inside of the transmission housing 12. An end 93p on one side in the axial direction of the collection flow path body 93c is open to the inside of the transmission housing 12. In the present example embodiment, the collection flow path body 93c is provided across the second housing 14, the first housing 13, and the third housing 15. That is, the collection flow path body 93c includes a flow path portion 93h provided in the first housing 13, a flow path portion 93i provided in the second housing 14, and a flow path portion 93j provided in the third housing 15. An end 93k on one side in the axial direction of the flow path portion 93h is connected to the end on the other side in the axial direction of the flow path portion 93j. An end 93m on the other side in the axial direction of the flow path portion 93h is connected to the end on one side in the axial direction of the flow path portion 93i. The collection flow path body 93c extends from the lower end of the connection portion 93b to one side in the axial direction, penetrates the first housing 13 and the third housing 15 in the axial direction, and is open to the inside of the transmission housing 12. The collection flow path body 93c is located on the lower side of the through hole 19a of the partition wall 19.

In the present example embodiment, the flow path portion 93h corresponds to a "first portion", and the flow path portion 93j corresponds to a "second portion". That is, in the present example embodiment, the second flow path 90 includes the flow path portion 93h as the first portion and the flow path portion 93j as the second portion connected to one side in the axial direction of the first portion. Therefore, the second flow path 90 can be suitably enlarged in the axial direction by the flow path portion 93h and the flow path portion 93j. The flow path portion 93j as the second portion penetrates the second opposing wall 15a in the axial direction and opens to the inside of the transmission housing 12. Therefore, the oil O can be returned from the flow path portion 93j into the transmission housing 12.

As illustrated in FIGS. 3 and 4, the cross section of the flow path of the collection flow path body 93c has a shape elongated in the circumferential direction. The circumferential dimension of the collection flow path body 93c is larger than the circumferential dimension of the groove portion 93a and the circumferential dimension of the connection portion 93b. Therefore, the flow rate of the oil O that can flow into the collection flow path body 93c can be increased. As a result, the amount of the oil O that can be returned from the inside of the motor housing 11 into the transmission housing 12 can be increased.

At least a part of the collection flow path body 93c is located radially outside the first flow path 50. As a result, at least a part of the collection flow path 93 is located radially outside the first flow path 50. As illustrated in FIG. 12, a part of the collection flow path body 93c is located on the lower side of a pair of axial flow path portions 51, which will be described later, disposed with the groove portion 93a interposed therebetween in the circumferential direction in the first flow path 50, a first circumferential flow path portion 52c, which will be described later, located on one side in the axial direction of the groove portion 93a in the first flow path 50, and a pair of second circumferential flow path portions 52b, which will be described later, disposed with the connection portion 93b interposed therebetween in the circumferential direction in the first flow path 50. In the present example embodiment, since the circumferential dimension of the collection flow path body 93c is larger than the circumferential dimension of the groove portion 93a and the circumferential dimension of the connection portion 93b as described above, the collection flow path body 93c can protrude in the circumferential direction from the groove portion 93a and the connection portion 93b. Therefore, the collection flow path body 93c can be easily disposed radially outside the first flow path 50.

The collection flow path body 93c is disposed adjacent to one circumferential direction side (+θ side) of the introduction flow path portion 92a. That is, in the present example embodiment, the introduction flow path portion 92a is disposed adjacent to the collection flow path 93 in the circumferential direction. In the present example embodiment, the portion of the motor housing 11 where the collection flow path body 93c and the introduction flow path portion 92a are provided protrudes on the lower side from the other portion of the motor housing 11.

The collection flow path body 93c is provided with a partition wall 93d that partitions the inside of the collection flow path body 93c in the circumferential direction. The partition wall 93d extends in the axial direction from the end 93p on one side in the axial direction of the flow path portion 93h toward the other side in the axial direction. In the present example embodiment, the partition wall 93d extends from the end 93k on one side in the axial direction of the flow path portion 93h to the central portion in the axial direction of the flow path portion 93h. In other words, the partition wall 93d extends from the end on one side in the axial direction of the first housing 13 to the central portion in the axial direction of the first housing 13. The partition wall 93d divides the collection flow path body 93c, which is long in the circumferential direction, into substantially two equal parts in the circumferential direction. The partition wall 93d can improve the strength of the portion of the housing 10 where the collection flow path body 93c is provided. Further, the axial force of the second bolt 10b can be more suitably transmitted to the first housing 13 and the third housing 15.

The partition wall 93d may not extend to the axial center of the flow path portion 93h, that is, the axial center of the first housing 13. For example, an end 93r on the other side in the axial direction of the partition wall 93d may be disposed at any position as long as it is located on the other side in the axial direction with respect to the end 93k on one side in the axial direction of the flow path portion 93h and located on one side in the axial direction with respect to the end 93m on the other side in the axial direction of the flow path portion 93h.

As illustrated in FIG. 3, the collection flow path body 93c has a recessed portion 93e recessed radially inward. The recessed portion 93e is located at the circumferential central portion of the other side in the axial direction of the collection flow path body 93c. An outer peripheral surface of a portion of the motor housing 11 where the recessed portion 93e is provided is recessed radially inward. Thus, for example, the second bolt 10b for fixing the first housing 13 and the third housing 15 can be prevented from interfering with the collection flow path body 93c.

Figure 13:
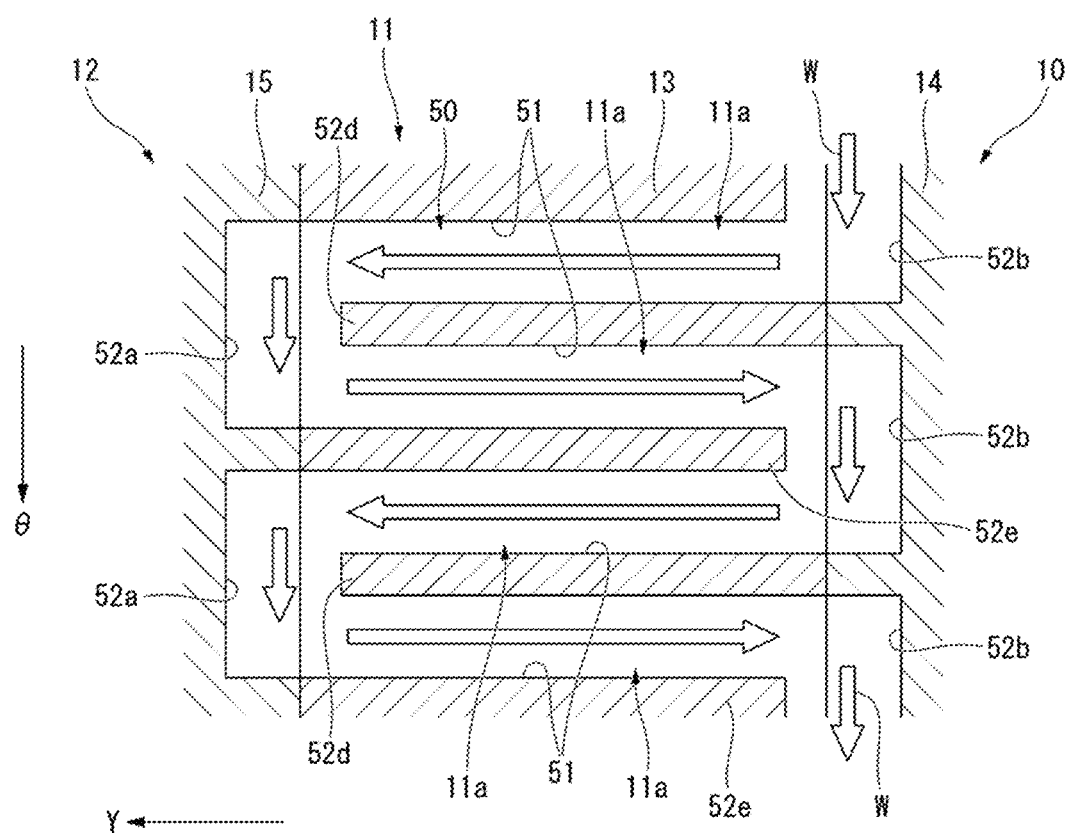
FIG. 13 is a sectional view illustrating a portion of a first flow path of the first example embodiment.
Figure 14:
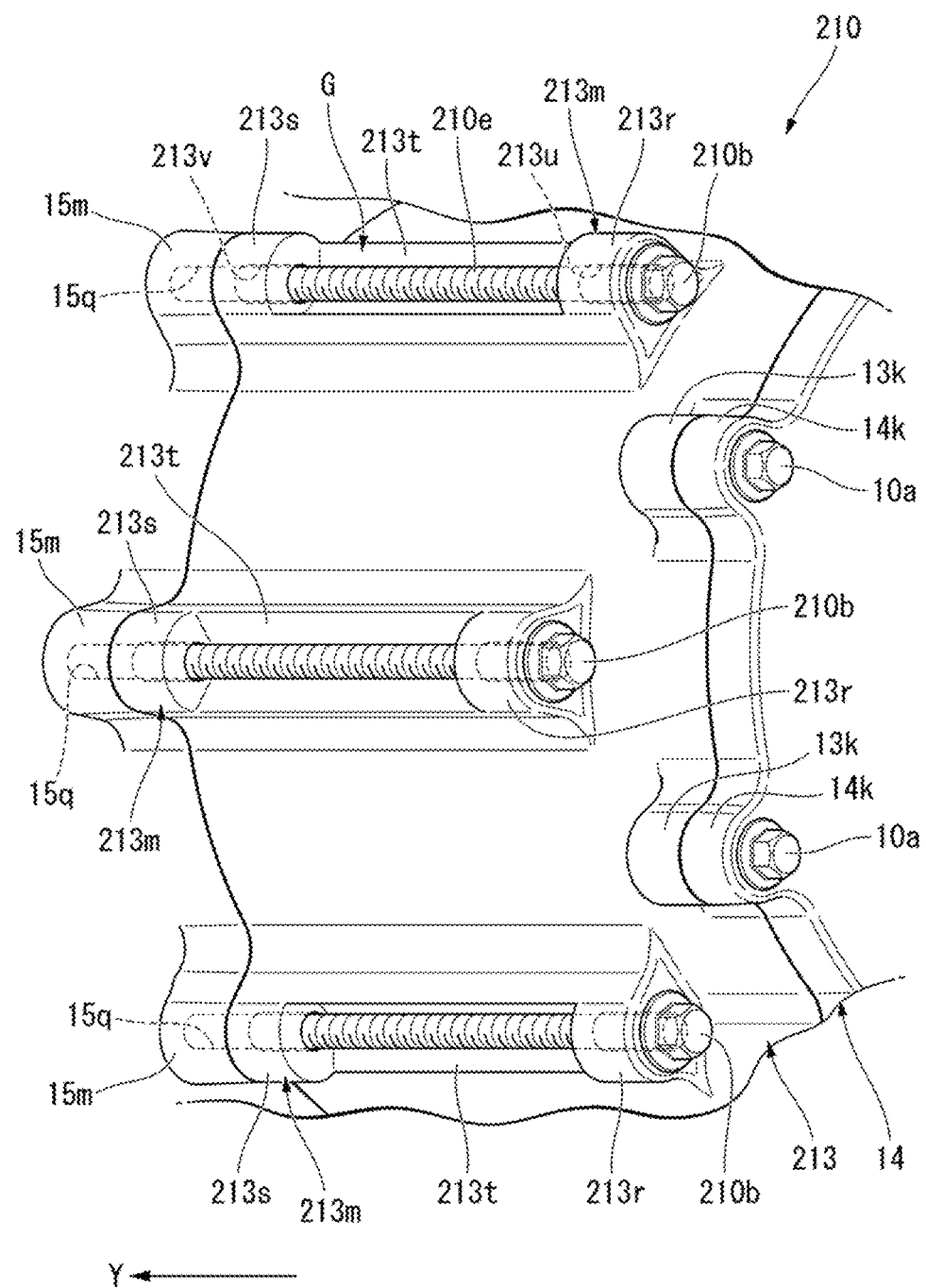
FIG. 14 is a perspective view illustrating a portion of a housing according to a second example embodiment of the present disclosure.

As illustrated in FIGS. 1 and 2, at least a part of the first flow path 50 is located radially outside the motor 20. In the present example embodiment, substantially the entire first flow path 50 except for both axial ends is located radially outside the motor 20. A portion of the first flow path 50 located on the lower side is located between the collection flow path body 93c and the motor 20 in the radial direction. As illustrated in FIGS. 12 and 13, in the present example embodiment, the first flow path 50 extends in a rectangular wave shape along the circumferential direction. The first flow path 50 includes a plurality of axial flow path portions 51, a plurality of first circumferential flow path portions 52a, and a plurality of second circumferential flow path portions 52b.

The plurality of axial flow path portions 51 extend in the axial direction. The plurality of axial flow path portions 51 are arranged at intervals in the circumferential direction. In the present example embodiment, the axial flow path portion 51 is provided in the motor housing 11. More specifically, the axial flow path portion 51 is provided in the first housing 13. As illustrated in FIG. 12, the two axial flow path portions 51 located on the lower side among the plurality of axial flow path portions 51 are disposed with the groove portion 93a interposed therebetween in the circumferential direction.

As illustrated in FIG. 1, the plurality of axial flow path portions 51 include an axial flow path portion 51c divided into two in the axial direction by a partition wall 51d. The axial flow path portion 51c includes an upstream flow path portion 51a and a downstream flow path portion 51b. In the present example embodiment, the upstream flow path portion 51a is a portion of the axial flow path portion 51c located on one side in the axial direction with respect to the partition wall 51d. In the present example embodiment, the downstream flow path portion 51b is a portion of the axial flow path portion 51c located on the other side in the axial direction with respect to the partition wall 51d.

As illustrated in FIG. 13, in the present example embodiment, the axial flow path portion 51 is configured by at least a part of a hole 11a penetrating the first housing 13 in the axial direction. The axial flow path portion 51 is configured by, for example, a portion excluding both axial ends of the hole 11a. The opening on one side in the axial direction of the hole 11a is closed by the third housing 15. The opening on the other side in the axial direction of the hole 11a is closed by the second housing 14.

As illustrated in FIG. 12, the first circumferential flow path portion 52a and the second circumferential flow path portion 52b extend in the circumferential direction. The plurality of first circumferential flow path portions 52a are arranged at intervals in the circumferential direction. The plurality of second circumferential flow path portions 52b are arranged at intervals in the circumferential direction. The first circumferential flow path portion 52a connects the ends on one side in the axial direction of the axial flow path portions 51 adjacent to each other in the circumferential direction. The second circumferential flow path portion 52b connects the ends on the other side in the axial direction of the axial flow path portions 51 adjacent to each other in the circumferential direction. The ends on both sides in the axial direction of the axial flow path portion 51 are alternately connected by the first circumferential flow path portion 52a and the second circumferential flow path portion 52b, so that the first flow path 50 has a rectangular wave shape.

The plurality of first circumferential flow path portions 52a include the first circumferential flow path portion 52c circumferentially across one side in the axial direction of the groove portion 93a. The first circumferential flow path portion 52c is the first circumferential flow path portion 52a located on the lowermost side among the plurality of first circumferential flow path portions 52a. The circumferential dimension of the first circumferential flow path portion 52c is larger than the circumferential dimension of the other first circumferential flow path portions 52a. The through hole 13e is located above the other circumferential side (−θ side) portion of the first circumferential flow path portion 52c.

The plurality of second circumferential flow path portions 52b include a pair of second circumferential flow path portions 52b that circumferentially sandwich the end on the other side in the axial direction of the groove portion 93a and the connection portion 93b. That is, in the present example embodiment, the end on the other side in the axial direction of the groove portion 93a and the connection portion 93b are located between the second circumferential flow path portions 52b adjacent to each other in the circumferential direction.

As illustrated in FIG. 13, in the present example embodiment, the first circumferential flow path portion 52a is provided across the motor housing 11 and the transmission housing 12. More specifically, the first circumferential flow path portion 52a is provided across the first housing 13 and the third housing 15. That is, at least a part of the first circumferential flow path portion 52a is provided in the third housing 15. At least a part of the inner surface of the first circumferential flow path portion 52a is a surface of the third housing 15. The first circumferential flow path portion 52a is configured by axially connecting a portion provided on the end surface on one side in the axial direction of the first housing 13 and a groove recessed from the end surface on the other side in the axial direction of the third housing 15 to one side in the axial direction.

In the present example embodiment, the second circumferential flow path portion 52b is provided across the first housing 13 and the second housing 14. That is, at least a part of the second circumferential flow path portion 52b is provided in the second housing 14. In addition, at least a part of the inner surface of the second circumferential flow path portion 52b is a surface of the second housing 14. In the present example embodiment, the first flow path 50 is provided across the first housing 13 and the second housing 14. The second circumferential flow path portion 52b is configured by axially connecting a portion provided on the end surface on the other side in the axial direction of the first housing 13 and a groove recessed from the end surface on one side in the axial direction of the second housing 14 to the other side in the axial direction.

An end on one side in the axial direction of a partition wall 52d that partitions the pair of axial flow path portions 51 connected by the first circumferential flow path portion 52a in the circumferential direction is disposed away from an end surface on one side in the axial direction of the first housing 13 on the other side in the axial direction. The end on the other side in the axial direction of a partition wall 52e that partitions the pair of axial flow path portions 51 connected by the second circumferential flow path portion 52b in the circumferential direction is disposed away from the end surface on the other side in the axial direction of the first housing 13 on one side in the axial direction.

In the axial flow path portion 51, the water W flows in the axial direction. The directions in which the water W flows in the axial flow path portions 51 adjacent to each other in the circumferential direction are opposite to each other. In the first circumferential flow path portion 52a and the second circumferential flow path portion 52b, the water W flows in one circumferential direction (+θ direction). The first circumferential flow path portion 52a connects an end on one side in the axial direction of the axial flow path portion 51 through which the water W flows in the direction toward one side in the axial direction and an end on one side in the axial direction of the axial flow path portion 51 through which the water W flows toward the other side in the axial direction. The second circumferential flow path portion 52b connects the end on the other side in the axial direction of the axial flow path portion 51 through which the water W flows in the direction toward the other side in the axial direction and the end on the other side in the axial direction of the axial flow path portion 51 through which the water W flows in the direction toward the one side in the axial direction.

As illustrated in FIG. 1, the first flow path 50 includes an inflow flow path portion 53a and an outflow flow path portion 53b. In the present example embodiment, the inflow flow path portion 53a and the outflow flow path portion 53b pass through the inside of the inverter unit 80. The water W flows into the inflow flow path portion 53a from the outside of drive device 100. The water W flowing into the inflow flow path portion 53a flows into the upstream flow path portion 51a. The water W flowing into the upstream flow path portion 51a flows around the motor 20 while flowing along a rectangular wave-shaped flow path configured by the axial flow path portion 51, the first circumferential flow path portion 52a, and the second circumferential flow path portion 52b, and flows into the outflow flow path portion 53b from the downstream flow path portion 51b. The water W flowing into the outflow flow path portion 53b flows out of the drive device 100.

As illustrated in FIG. 6, fastening surfaces 13x and 14x between the first housing 13 and the second housing 14 fixed to each other by the first bolt 10a are sealing surfaces that seal a part of the first flow path 50 at the connection portion between the first housing 13 and the second housing 14. The fastening surface 13x is a surface on the other side in the axial direction of the first housing 13. The fastening surface 14x is a surface on one side in the axial direction of the second housing 14. The fastening surfaces 13x and 14x are also sealing surfaces that seal a part of the second flow path 90 at the connection portion between the first housing 13 and the second housing 14. Therefore, a part of the first flow path 50 and a part of the second flow path 90 at the connection portion between the first housing 13 and the second housing 14 can be sealed together by the first bolt 10a. As a result, the housing 10 can be easily assembled as compared with a case where the seal of the first flow path 50 and the seal of the second flow path 90 are performed with different bolts. In addition, it is easy to reduce the number of components of the drive device 100.

Fastening surfaces 13y and 15y between the first housing 13 and the third housing 15 fixed to each other by the second bolt 10b are sealing surfaces that seal a part of the first flow path 50 at the connection portion between the first housing 13 and the third housing 15. The fastening surface 13y is a surface on one side in the axial direction of the first housing 13. The fastening surface 15y is a surface on the other side in the axial direction of the third housing 15. The fastening surfaces 13y and 15y are also sealing surfaces that seal a part of the second flow path 90 at the connection portion between the first housing 13 and the third housing 15. Therefore, a part of the first flow path 50 and a part of the second flow path 90 at the connection portion between the first housing 13 and the third housing 15 can be sealed together by the second bolt 10b. As a result, the housing 10 can be more easily assembled as compared with a case where the seal of the first flow path 50 and the seal of the second flow path 90 are performed with different bolts. In addition, it is easy to further reduce the number of components of the drive device 100.

As illustrated in FIG. 2, the housing 10 includes an oil supply path 95. The oil supply path 95 extends from the inside of the transmission housing 12 to penetrate the second opposing wall 15a in the axial direction. In the present example embodiment, the oil supply path 95 penetrates the first opposing wall 13a in the axial direction and extends to the inside of the motor housing 11. As illustrated in FIG. 5, the oil supply path 95 has a supply port 13h for supplying the oil O to the bearing 72 held by the bearing holding portion 13c. In the present example embodiment, the supply port 13h is an opening that opens in the surface of the first hole 13g on the other side in the axial direction of the first opposing wall 13a. The supply port 13h is open to the inside of the motor housing 11. As illustrated in FIG. 3, the supply port 13h is located above the central axis J1. The supply port 13h is open to the inside of the penetration portion 13f. When viewed in the axial direction, the supply port 13h overlaps the penetration portion 13f.

In the present example embodiment, the oil supply path 95 includes the first hole 13g, the second hole 15g, the first gutter portion 17, and the second gutter portion 18. As indicated by a broken arrow in FIG. 5, a part of the oil O that has been scraped up by the ring gear 62a and entered the second gutter portion 18 passes through the second hole 15g and flows into the first gutter portion 17 in the space S. The oil O flowing into the first gutter portion 17 flows in the first gutter portion 17, passes through the first hole 13g, and is supplied from the supply port 13h into the motor housing 11. The oil O discharged from the supply port 13h flows into the bearing holding portion 13c via the penetration portion 13f and is supplied to the bearing 72.

According to the present example embodiment, at least a part of the first flow path 50 is located radially outside the motor 20. Therefore, the motor 20 can be cooled by the water W flowing in the first flow path 50. In the present example embodiment, the stator 40 can be cooled by the water W flowing in the first flow path 50. At least a part of the collection flow path 93 is located radially outside the first flow path 50. Therefore, the collection flow path 93 can be disposed close to the first flow path 50. As a result, the oil O passing through the collection flow path 93 can be easily cooled by the water W flowing in the first flow path 50. Therefore, the temperature of the oil O flowing into the transmission housing 12 from the collection flow path 93 can be lowered. Therefore, the temperature of the oil O supplied from the inside of the transmission housing 12 to the inside of the motor housing 11 by the first supply flow path 91 and the second supply flow path 92 can be made relatively low. As a result, the relatively low-temperature oil O can be supplied to the motor 20 accommodated in the motor housing 11. Therefore, the motor 20 can be suitably cooled by the relatively low-temperature oil O. As described above, in the present example embodiment, the motor 20 can be suitably cooled by the water W and the oil O. Therefore, the cooling efficiency of the motor 20 can be improved. In addition, it is possible to easily cool the motor 20 without providing a cooler such as an oil cooler in order to cool the oil O. Therefore, the number of components of the drive device 100 can be reduced by the absence of the cooler.

According to the present example embodiment, the first flow path 50 extends in a rectangular wave shape along the circumferential direction. Therefore, the portion of the housing 10 where the first flow path 50 is provided can be widened, and the motor 20 can be more suitably cooled by the water W flowing in the first flow path 50. Therefore, the cooling efficiency of the motor 20 can be further improved. In addition, in a case where the housing 10 is divided into a plurality of members as in the present example embodiment, the first flow path 50 is easily formed by using each member constituting the housing 10 for constituting the first flow path 50. According to the present example embodiment, at least a part of the first flow path 50 is configured by the first housing 13 and the third housing 15. Therefore, it is easy to lengthen the first flow path 50 to one side in the axial direction where the transmission housing 12 is located. As a result, it is easy to suitably cool the motor 20 by the first flow path 50. Here, in the present example embodiment, as described above, since the motor housing 11 and the transmission housing 12 are assembled by two housings, the motor housing 11 and the transmission housing 12 can be separated. With such a structure, the first flow path 50 can be configured using the third housing 15 constituting the transmission housing 12, and the first flow path 50 can be more suitably provided large in the axial direction. In the present example embodiment, the first flow path 50 can extend to one side in the axial direction from the bearing 72 held by the first opposing wall 13a.

In the present example embodiment, at least a part of the first circumferential flow path portion 52a is provided in the third housing 15. Therefore, a part of the first flow path 50 can also be provided in the third housing 15. As a result, the first flow path 50 can be suitably enlarged in the axial direction, and the motor 20 can be more suitably cooled. In the present example embodiment, at least a part of the second circumferential flow path portion 52b is provided in the second housing 14. Therefore, a part of the first flow path 50 can also be provided in the second housing 14. As a result, the first flow path 50 can be more suitably enlarged in the axial direction, and the motor 20 can be more suitably cooled.

In the present example embodiment, the first flow path can be easily formed by providing the hole 11a axially penetrating the first housing 13 and closing both axial sides of the hole 11a with the second housing 14 and the third housing 15. In the present example embodiment, the opening on one side in the axial direction of the hole 11a is closed by the third housing 15, and the opening on the other side in the axial direction of the hole 11a is closed by the second housing 14. In addition, at least a part of the inner surface of the first circumferential flow path portion 52a is a surface of the third housing 15. At least a part of the inner surface of the second circumferential flow path portion 52b is a surface of the second housing 14. Therefore, the first flow path 50 can be easily formed.

According to the present example embodiment, the first circumferential flow path portion 52a is provided across the first housing 13 and the third housing 15. Therefore, for example, as compared with a case where the entire first circumferential flow path portion 52a is provided in the third housing 15, it is possible to suppress an increase in size of the third housing 15 in the axial direction. Thus, the drive device 100 can be prevented from increasing in size in the radial direction. In addition, since the first flow path 50 can be suitably extended to one side in the axial direction from the stator 40, the range of the stator 40 that can be cooled by the first flow path 50 can be widened. As a result, the motor 20 can be more suitably cooled by the water W flowing in the first flow path 50.

According to the present example embodiment, the collection flow path 93 includes the groove portion 93a provided on the inner peripheral surface of the motor housing 11 and extending in the axial direction, the collection flow path body 93c located radially outside the groove portion 93a and extending in the axial direction and connected to the inside of the transmission housing 12, and the connection portion 93b connecting the groove portion 93a and the collection flow path body 93c. Therefore, at least a part of the oil O supplied into the motor housing 11 by the first supply flow path 91 and the second supply flow path 92 can flow into the collection flow path 93 from the groove portion 93a. Further, the oil O flowing into the groove portion 93a can be sent into the transmission housing 12 via the connection portion 93b and the collection flow path body 93c. As a result, the oil O in the motor housing 11 can be easily returned into the transmission housing 12 by the collection flow path 93. According to the present example embodiment, at least a part of the collection flow path body 93c is located radially outside the first flow path 50. Therefore, the oil O flowing in the collection flow path body 93c can be easily cooled by the water W flowing in the first flow path 50.

According to the present example embodiment, the connection portion 93b connects the end on the other side in the axial direction of the groove portion 93a and the end on the other side in the axial direction of the collection flow path body 93c. That is, the position where the groove portion 93a and the collection flow path body 93c are connected by the connection portion 93b can be set to a position relatively distant from the transmission housing 12 in the axial direction. Therefore, it is possible to increase the distance by which the oil O flows from the connection portion 93b into the collection flow path body 93c and reaches the inside of the transmission housing 12. As a result, it is possible to extend the time during which the oil O flowing in the collection flow path body 93c can be cooled by the water W flowing in the first flow path 50. Therefore, the oil O flowing in the collection flow path body 93c can be suitably cooled by the water W flowing in the first flow path 50. Therefore, the lower temperature oil O can be easily supplied to the motor 20. As a result, the cooling efficiency of the motor 20 can be further improved.

According to the present example embodiment, the plurality of first circumferential flow path portions 52a include the first circumferential flow path portion 52c circumferentially across one side in the axial direction of the groove portion 93a. The connection portion 93b is located between the second circumferential flow path portions 52b adjacent to each other in the circumferential direction. As described above, the first circumferential flow path portion 52c straddles the groove portion 93a on the side opposite to the side where the connection portion 93b is provided in the axial direction, so that the connection portion 93b can be extended from the radially inner side of the first flow path 50 to the radially outer side of the first flow path 50 without interfering with the first flow path 50. As a result, at least a part of the collection flow path body 93c can be disposed radially outside the first flow path 50 without interfering with the first flow path 50.

According to the present example embodiment, the second supply flow path 92 has the introduction flow path portion 92a extending in the axial direction from the inside of the transmission housing 12. At least a part of the introduction flow path portion 92a is located radially outside the first flow path 50. Therefore, the introduction flow path portion 92a can be disposed close to the first flow path 50. Thus, the oil O passing through the introduction flow path portion 92a can be easily cooled by the water W flowing in the first flow path 50. Therefore, the temperature of the oil O supplied to the inside of the motor housing 11 by the second supply flow path 92 can be made relatively low. Therefore, the motor 20 accommodated in the motor housing 11 can be more suitably cooled by the oil O. Therefore, the cooling efficiency of the motor 20 can be further improved.

According to the present example embodiment, the introduction flow path portion 92a is disposed adjacent to the collection flow path 93 in the circumferential direction. Therefore, the introduction flow path portion 92a and the collection flow path 93 can be collectively disposed. This can suppress complication of the structure of the housing 10.

According to the present example embodiment, the collection flow path 93 and the first flow path 50 are provided across the first housing 13 and the second housing 14, respectively. Therefore, the collection flow path 93 and the first flow path 50 can be enlarged in the axial direction. As a result, it is easy to increase the number of portions of the collection flow path 93 disposed close to the first flow path 50. Therefore, the oil O flowing in the collection flow path 93 can be more easily cooled by the water W flowing in the first flow path 50. In addition, since the first flow path 50 can be enlarged in the axial direction, the range of the motor 20 that can be cooled by the water W flowing in the first flow path 50 can be widened in the axial direction. As a result, the entire stator core 41 and the coil ends 42a and 42b protruding from the stator core 41 to both sides in the axial direction can be easily cooled by the water W flowing in the first flow path 50. As described above, the cooling efficiency of the motor 20 can be further improved.

According to the present example embodiment, the first housing 13 and the second housing 14 are fixed to each other at positions radially inside the collection flow path 93 and adjacent to the first flow path 50 in the circumferential direction. In the present example embodiment, the first housing 13 and the second housing 14 are fixed to each other at the positions by the fourth bolt 10d tightened into the female screw hole 13i. As a result, the first housing 13 and the second housing 14 can be fixed at positions close to both the collection flow path 93 and the first flow path 50. Therefore, it is possible to prevent portions of the first housing 13 and the second housing 14 constituting the collection flow path 93 from being separated from each other. In addition, it is possible to prevent portions of the first housing 13 and the second housing 14 constituting the first flow paths 50 from being separated from each other. This can suppress leakage of the oil O from the collection flow path 93 and leakage of the water W from the first flow path 50. Further, it is possible to prevent the oil O leaking from the collection flow path 93 from entering the first flow path 50 and mixing with the water W. In addition, it is possible to suppress the water W leaking from the first flow path 50 from entering the collection flow path 93 and mixing with the oil O.

According to the present example embodiment, the partition wall 19 has the through hole 19a connecting the inside of the motor housing 11 and the inside of the transmission housing 12. Therefore, the oil O supplied into the motor housing 11 can be returned into the transmission housing 12 from the through hole 19a in addition to the collection flow path 93. As a result, the amount of the oil O returned from the motor housing 11 into the transmission housing 12 can be increased.

For example, when the housing 10 is configured by two separate members constituting the motor housing 11 and two separate members constituting the transmission housing 12 as in the present example embodiment, the motor housing 11 and the transmission housing 12 are provided separately. In such a case, conventionally, the motor housing 11 and the transmission housing 12 are provided with structures for lubricating the bearings separately. Therefore, there is a problem that the manufacturing cost of the drive device 100 increases due to a complicated structure of the housing 10 or the use of a relatively expensive bearing that does not require the supply of lubricating oil. The relatively expensive bearing requiring no supply of lubricating oil is, for example, a bearing provided with semi-solid grease.

On the other hand, according to the present example embodiment, the housing 10 has the oil supply path 95 extending axially through the second opposing wall 15a from the inside of the transmission housing 12. The oil supply path 95 has the supply port 13h for supplying the oil O to the bearing 72 held by the first opposing wall 13a of the motor housing 11. The supply port 13h is located above the central axis J1. Therefore, the oil O discharged from the supply port 13h can be dropped by gravity and supplied to the bearing 72 provided in the motor housing 11 among the bearings supporting the rotor 30 rotatable about the central axis J1. That is, a part of the oil O in the transmission housing 12 can be supplied to the bearing 72 provided in the motor housing 11 by the oil supply path 95. In this manner, the bearing 72 provided in the motor housing 11 can be lubricated using the bearing lubrication structure provided in the transmission housing 12. That is, in the drive device 100, the bearing 72 provided in the motor housing 11 can be lubricated using the oil O in the transmission housing 12 while the motor housing 11 and the transmission housing 12 are configured to be separable. Therefore, it is possible to suppress complication of the structure of the housing 10, and it is not necessary to use a bearing that does not require supply of lubricating oil as the bearing 72. Therefore, it is possible to suppress an increase in manufacturing cost of the drive device 100.

According to the present example embodiment, the bearing holding portion 13c is provided on the surface on the other side in the axial direction of the first opposing wall 13a. The oil supply path 95 penetrates the first opposing wall 13a in the axial direction and extends to the inside of the motor housing 11. The supply port 13h is open to the inside of the motor housing 11. Therefore, even when the bearing 72 held by the bearing holding portion 13c is located inside the motor housing 11, the oil O can be supplied to the bearing 72 by the oil supply path 95.

Further, according to the present example embodiment, the bearing holding portion 13c has the penetration portion 13f that penetrates the bearing holding portion 13c in the radial direction. The supply port 13h is open to the inside of the penetration portion 13f. Therefore, the oil O discharged from the supply port 13h is easily supplied from the penetration portion 13f to the inside of the bearing holding portion 13c. As a result, the oil O can be more easily supplied to the bearing 72.

According to the present example embodiment, the oil supply path 95 includes the first hole 13g axially penetrating the first opposing wall 13a, the second hole 15g axially penetrating the second opposing wall 15a, and the first gutter portion 17 located between the first opposing wall 13a and the second opposing wall 15a in the axial direction and connecting the first opposing wall 13a and the second opposing wall 15a. The first gutter portion 17 is connected to a portion located on the lower side of the first hole 13g in the surface on one side in the axial direction of the first opposing wall 13a and a portion located on the lower side of the second hole 15g in the surface on the other side in the axial direction of the second opposing wall 15a. Therefore, the oil O in the transmission housing 12 can be supplied into the motor housing 11 through the second hole 15g, the first gutter portion 17, and the first hole 13g in this order. As a result, the oil O in the transmission housing 12 can be more suitably supplied to the bearing 72 in the motor housing 11.

According to the present example embodiment, the oil supply path 95 includes the second gutter portion 18 located inside the transmission housing 12. The second gutter portion 18 is connected to a portion located below the second hole 15g in the surface on one side in the axial direction of the second opposing wall 15a. Therefore, for example, a part of the oil O scattered in the transmission housing 12 by being scraped up by the ring gear 62a can be received by the second gutter portion 18. In addition, at least a part of the oil O received by the second gutter portion 18 can flow into the second hole 15g. As a result, the oil O in the transmission housing 12 can be more suitably supplied to the bearing 72 in the motor housing 11 through the second hole 15g, the first gutter portion 17, and the first hole 13g in this order.

In addition, according to the present example embodiment, the second opposing wall 15a has the through hole 15h connecting the space S located between the first opposing wall 13a and the second opposing wall 15a in the axial direction and the inside of the transmission housing 12. Therefore, for example, the oil O leaking from the inside of the first gutter portion 17 can be returned into the transmission housing 12 through the through hole 15h. Thus, the oil O can be prevented from accumulating in the space S.

According to the present example embodiment, the first opposing wall 13a has the through hole 13e connecting the space S located between the first opposing wall 13a and the second opposing wall 15a in the axial direction and the inside of the motor housing 11. Therefore, the inside of the motor housing 11 and the inside of the transmission housing 12 can be connected by the through hole 13e, the space S, and the through hole 15h. As a result, the above-described through hole 19a is formed, and at least a part of the oil O supplied into the motor housing 11 can be returned into the transmission housing 12.

At least one of a plurality of third protrusions 213m provided in a first housing 213 in a housing 210 of the present example embodiment has a pair of opposing portions 213r and 213s disposed with a gap G interposed therebetween in the axial direction. At least one third protrusion 213m having the pair of opposing portions 213r and 213s is fixed to the fourth protrusion 15m by a second bolt 210b passing through both of through holes 213u and 213v provided in the pair of opposing portions 213r and 213s and the gap G. Therefore, the weight of the third protrusion 213m can be reduced by the amount of the gap G provided between the opposing portions 213r and 213s in the axial direction. Thus, the weight of the housing 210 can be reduced. On the other hand, since the second bolt 210b passes through the through holes 213u and 213v of the pair of opposing portions 213r and 213s, it is possible to suppress the second bolt 210b from being inclined with respect to the axial direction. The through hole 213u penetrates the facing portion 213r in the axial direction. The through hole 213v penetrates the facing portion 213s in the axial direction. The second bolt 210b that fixes the pair of opposing portions 213r and 213s has an exposed portion 210e that passes through the gap G and is exposed to the outside of the housing 210.

In the present example embodiment, all of the plurality of third protrusions 213m have a pair of opposing portions 213r and 213s, respectively. In the present example embodiment, each of the third protrusions 213m has a connection portion 213t connecting the facing portion 213r and the facing portion 213s in the axial direction. The connection portion 213t axially connects the radially inner portion of the facing portion 213r and the radially inner portion of the facing portion 213s. The connection portion 213t is located radially inside the exposed portion 210e. The axial dimension of the connection portion 213t is the same as the axial dimension of the gap G. The axial dimension of the connection portion 213t is larger than the axial dimension of the opposing portions 213r and 213s. The axial dimension of the connection portion 213t is, for example, three times or more the axial dimension of the opposing portions 213r and 213s. The facing portion 213r is an end on the other side in the axial direction of the third protrusion 213m. The facing portion 213s is an end on one side in the axial direction of the third protrusion 213m. The facing portion 213s is in contact with the fourth protrusion 15m.

Other configurations of the housing 210 can be similar to other configurations of the housing 10 of the first example embodiment. In the present example embodiment, only some third protrusions 213m among the plurality of third protrusions 213m may have the pair of opposing portions 213r and 213s, and the other third protrusions 213m may have the same configuration as the third protrusions 13m of the first example embodiment. The third protrusion 13m having the pair of opposing portions 213r and 213s may not have the connection portion 213t.

The present disclosure is not limited to the above-described example embodiment, and other structures and other methods may be employed within the scope of the technical idea of the present disclosure. The second flow path may have any configuration as long as the second flow path includes the supply flow path and the collection flow path. In the above-described example embodiment, the first supply flow path 91 and the second supply flow path 92 are provided as the supply flow path, but the present disclosure is not limited thereto. As the supply flow path, only one of the first supply flow path 91 and the second supply flow path 92 may be provided.

The collection flow path extending from the inside of the motor housing to the inside of the transmission housing may have any configuration as long as at least a part thereof is located radially outside the first flow path. When the motor housing has the first housing and the second housing, the collection flow path may be provided only in the first housing in the motor housing. The shape and size of the groove, the shape and size of the connection portion, and the shape and size of the collection flow path body are not particularly limited. The groove and the connection portion may not be provided.

The first flow path may have any shape. The first circumferential flow path portion may not be provided across the first housing and the third housing. The second circumferential flow path portion may not be provided across the first housing and the second housing. For example, the first flow path may extend in a rectangular wave shape along the axial direction by connecting axial ends of a plurality of flow path portions extending in the circumferential direction and arranged at intervals in the axial direction. The first flow path may extend spirally. The number of the axial flow path portions is not particularly limited as long as it is two or more. The number of the first circumferential flow path portions and the number of the second circumferential flow path portions are not particularly limited as long as they are one or more.

The type of the first fluid flowing into the first flow path and the type of the second fluid flowing into the second flow path are not particularly limited. The first fluid and the second fluid may be the same type of fluid. The second fluid may be an insulating liquid or water. When the second fluid is water, the surface of the stator may be subjected to an insulation treatment. The first fluid may be oil. At least one of the first flow path and the second flow path may not be provided.

The oil supply path extending from the inside of the transmission housing through the second opposing wall in the axial direction may have any configuration as long as the oil supply passage has a supply port that is located above the central axis and supplies oil to the bearing. When the bearing holding portion provided on the first opposing wall of the motor housing is provided on the surface on one side in the axial direction of the first opposing wall, that is, the surface of the first opposing wall facing the transmission housing side, the oil supply path may penetrate only the second opposing wall and may not penetrate the first opposing wall. In this case, for example, the supply port of the oil supply path is open to the space between the first opposing wall and the second opposing wall. The oil supply path may not have at least one of the first hole, the second hole, the first gutter portion, and the second gutter portion. The oil supply path may be formed of, for example, a tubular member such as a pipe. The oil supply path may not be provided.

The application of the drive device to which the present disclosure is applied is not particularly limited. For example, the drive device may be mounted on a vehicle for a purpose other than the purpose of rotating the axle, or may be mounted on a device other than the vehicle. The posture when the drive device is used is not particularly limited. The central axis of the motor may be inclined with respect to the horizontal direction orthogonal to the vertical direction or may extend in the vertical direction. Features as described above in the present specification may be combined appropriately as long as no conflict arises.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:
1. A drive device comprising:
a motor including a rotor rotatable about a central axis and a stator covering a radially outer side of the rotor;
a transmission connected to the motor; and
a housing including a motor housing accommodating the motor therein and a transmission housing fixed to one side in an axial direction of the motor housing and accommodating the transmission therein; wherein
the motor housing includes:
a first housing fixed to the transmission housing; and
a second housing fixed to another side in an axial direction of the first housing with first bolts;
the transmission housing includes:
a third housing fixed to the first housing with second bolts; and
a fourth housing fixed to one side in an axial direction of the third housing with third bolts;
the first bolts fixing the first housing and the second housing each pass through through-holes in the second housing from the another side in an axial direction, and are fixed to bolt holes in the first housing;
the second bolts fixing the first housing and the third housing each pass through through-holes in the first housing from the another side in an axial direction, and are fixed to bolt holes in the third housing;
the third bolts fixing the third housing and the fourth housing each pass through through-holes in the fourth housing from one side in an axial direction, and are fixed to bolt holes in the third housing;
circumferential positions of the first bolts are different from circumferential positions of the second bolts; and
circumferential positions of the third bolts and the circumferential positions of the second bolts are such that the third bolts overlap the second bots when viewed along the axial direction.
2. The drive device according to claim 1, wherein
the first bolts fixing the first housing and the second housing respectively fix first protrusions on an outer peripheral surface of the first housing and a second protrusions on an outer peripheral surface of the second housing.
3. The drive device according to claim 2, wherein
the second bolts fixing the first housing and the third housing respectively fix third protrusions on an outer peripheral surface of the first housing and fourth protrusions on an outer peripheral surface of the third housing.
4. The drive device according to claim 3, wherein
at least one of the third protrusions includes a pair of opposing portions with a gap interposed therebetween in an axial direction, and is fixed to the fourth protrusion by the second bolt passing through both through-holes in the pair of opposing portions and the gap.
5. The drive device according to claim 1, wherein
the first bolts and the second bolts are alternately arranged along a circumferential direction around the central axis when viewed in an axial direction.
6. The drive device according to claim 1, wherein
the first bolts are arranged at equal intervals over an entire circumference along a circumferential direction around the central axis; and
the second bolts are arranged at equal intervals over the entire circumference along a circumferential direction around the central axis.
7. The drive device according to claim 1, wherein
the housing includes a flow path through which a refrigerant to cool the stator flows; and
at least a portion of the flow path includes the first housing, the second housing, and the third housing.
8. The drive device according to claim 1, further comprising:
a bearing that rotatably supports the rotor; wherein
the first housing includes:
a first opposing wall that axially faces the third housing; and
a bearing holding portion on the first opposing wall to hold the bearing;
the housing includes a first flow path through which a first fluid flows;
the first flow path includes:
axial flow path portions extending in an axial direction and arranged at intervals in a circumferential direction;
a first circumferential flow path portion connecting ends on one side in an axial direction of the axial flow path portions adjacent to each other in the circumferential direction; and
a second circumferential flow path portion connecting ends on another side in the axial direction of the axial flow path portions adjacent to each other in the circumferential direction; and
at least a portion of the first flow path extending in a rectangular wave shape along a circumferential direction is defined by the first housing and the third housing.
9. The drive device according to claim 8, wherein
the axial flow path portion is defined by at least a portion of a hole axially penetrating the first housing;
an opening on one side in an axial direction of the hole is covered by the third housing;
an opening on another side in an axial direction of the hole is closed by the second housing;
at least a portion of an inner surface of the first circumferential flow path portion is a surface of the third housing; and at least a portion of an inner surface of the second circumferential flow path portion is a surface of the second housing.

10. The drive device according to claim 9, wherein
at least a portion of the first circumferential flow path portion is in the third housing; and
at least a portion of the second circumferential flow path portion is in the second housing.

11. The drive device according to claim 8, wherein
the housing includes a second flow path through which a second fluid flows;
at least a portion of the second flow path is defined by the first housing and the third housing;
a fastening surface between portions of the first housing and the third housing which are fixed to each other through the second bolt is a sealing surface that seals a portion of the first flow path at a connection portion between the first housing and the third housing, and is a sealing surface that seals a portion of the second flow path at a connection portion between the first housing and the third housing.

12. The drive device according to claim 11, wherein
the second flow path includes:
 a first portion in the first housing; and
 a second portion in the third housing and connected to one side in an axial direction of the first portion.

13. The drive device according to claim 12, wherein
the third housing includes a second opposing wall that axially opposes the first opposing wall; and
the second portion penetrates the second opposing wall in an axial direction and opens to an inside of the transmission housing.

14. A drive device comprising:
a motor including a rotor rotatable about a central axis and a stator covering a radially outer side of the rotor;
a transmission connected to the motor; and
a housing including a motor housing accommodating the motor therein and a transmission housing fixed to one side in an axial direction of the motor housing and accommodating the transmission therein; wherein
the motor housing includes:
 a first housing fixed to the transmission housing; and
 a second housing fixed to another side in an axial direction of the first housing with first bolts;
the transmission housing includes:
 a third housing fixed to the first housing with second bolts; and
 a fourth housing fixed to one side in an axial direction of the third housing with third bolts;
the first bolts fixing the first housing and the second housing each pass through through-holes in the second housing from the another side in an axial direction, and are fixed to bolt holes in the first housing;
the second bolts fixing the first housing and the third housing each pass through through-holes in the first housing from the another side in an axial direction, and are fixed to bolt holes in the third housing;
the third bolts fixing the third housing and the fourth housing each pass through through-holes in the fourth housing from one side in an axial direction, and are fixed to bolt holes in the third housing; and
the housing includes a first flow path with an inflow flow path portion and an outflow flow path portion;
the first flow path includes an upstream flow path portion and a downstream path portion;
the inflow flow path portion is connected to the upstream flow path portion;
the outflow flow path portion is connected to the downstream flow path portion; and
when viewed in a vertical direction, the inflow flow path portion and the outflow flow path portion cross a differential axis.

15. A drive device comprising:
a motor including a rotor rotatable about a central axis and a stator covering a radially outer side of the rotor;
a transmission connected to the motor; and
a housing including a motor housing accommodating the motor therein and a transmission housing fixed to one side in an axial direction of the motor housing and accommodating the transmission therein; wherein
the motor housing includes:
a first housing fixed to the transmission housing; and
a second housing fixed to another side in an axial direction of the first housing with first bolts;
the transmission housing includes:
a third housing fixed to the first housing with second bolts; and
a fourth housing fixed to one side in an axial direction of the third housing with third bolts;
the first bolts fixing the first housing and the second housing each pass through through-holes in the second housing from the another side in an axial direction, and are fixed to bolt holes in the first housing;
the second bolts fixing the first housing and the third housing each pass through through-holes in the first housing from the another side in an axial direction, and are fixed to bolt holes in the third housing; and
the third bolts fixing the third housing and the fourth housing each pass through through-holes in the fourth housing from one side in an axial direction, and are fixed to bolt holes in the third housing,
a bearing that rotatably supports the rotor; wherein
the first housing includes:
 a first opposing wall that axially faces the third housing; and
 a bearing holding portion on the first opposing wall to hold the bearing;
the housing includes a first flow path through which a first fluid flows;
the first flow path includes:
 axial flow path portions extending in an axial direction and arranged at intervals in a circumferential direction;
 a first circumferential flow path portion connecting ends on one side in an axial direction of the axial flow path portions adjacent to each other in the circumferential direction; and
 a second circumferential flow path portion connecting ends on another side in the axial direction of the axial flow path portions adjacent to each other in the circumferential direction; and
at least a portion of the first flow path extending in a rectangular wave shape along a circumferential direction is defined by the first housing and the third housing.

16. The drive device according to claim 15, wherein
the axial flow path portion is defined by at least a portion of a hole axially penetrating the first housing;
an opening on one side in an axial direction of the hole is covered by the third housing;
an opening on another side in an axial direction of the hole is closed by the second housing;

at least a portion of an inner surface of the first circumferential flow path portion is a surface of the third housing; and at least a portion of an inner surface of the second circumferential flow path portion is a surface of the second housing.

17. The drive device according to claim 16, wherein
at least a portion of the first circumferential flow path portion is in the third housing; and
at least a portion of the second circumferential flow path portion is in the second housing.

18. The drive device according to claim 15, wherein
the housing includes a second flow path through which a second fluid flows;
at least a portion of the second flow path is defined by the first housing and the third housing;
a fastening surface between portions of the first housing and the third housing which are fixed to each other through the second bolt is a sealing surface that seals a portion of the first flow path at a connection portion between the first housing and the third housing, and is a sealing surface that seals a portion of the second flow path at a connection portion between the first housing and the third housing.

19. The drive device according to claim 18, wherein
the second flow path includes:
a first portion in the first housing; and
a second portion in the third housing and connected to one side in an axial direction of the first portion.

20. The drive device according to claim 19, wherein
the third housing includes a second opposing wall that axially opposes the first opposing wall; and
the second portion penetrates the second opposing wall in an axial direction and opens to an inside of the transmission housing.

* * * * *